United States Patent
Sarmento et al.

(10) Patent No.: US 9,747,628 B1
(45) Date of Patent: Aug. 29, 2017

(54) GENERATING CATEGORY LAYOUTS BASED ON QUERY FINGERPRINTS

(71) Applicant: Amazon Technologies, Inc., Reno, NV (US)

(72) Inventors: Luis Antonio Diniz Fernandes de Morais Sarmento, Seattle, WA (US); Lisa Jane Hinegardner, Issaquah, WA (US); Thomas Jay Hoover, Seattle, WA (US); Alexander Michael Spinelli, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 577 days.

(21) Appl. No.: 14/290,822

(22) Filed: May 29, 2014

Related U.S. Application Data

(63) Continuation-in-part of application No. 14/217,003, filed on Mar. 17, 2014, and a continuation-in-part of application No. 14/217,021, filed on Mar. 17, 2014, and a continuation-in-part of application No. 14/217,036, filed on Mar. 17, 2014.

(51) Int. Cl.
*G06Q 30/06* (2012.01)

(52) U.S. Cl.
CPC ..... *G06Q 30/0625* (2013.01); *G06Q 30/0643* (2013.01)

(58) Field of Classification Search
CPC ..... G06Q 30/06; G06Q 30/0625; G06F 17/30
USPC .............................................. 705/26.1, 26.62
See application file for complete search history.

(56) References Cited

U.S. PATENT DOCUMENTS

| | | |
|---|---|---|
| 6,747,687 B1 | 6/2004 | Alves |
| 9,116,952 B1 | 8/2015 | Heiler et al. |
| 2002/0198882 A1 | 12/2002 | Linden et al. |
| 2005/0050021 A1 | 3/2005 | Timmons |
| 2006/0224571 A1 | 10/2006 | Leon et al. |
| 2007/0038601 A1 | 2/2007 | Guha et al. |
| 2007/0067304 A1* | 3/2007 | Ives ................. G06Q 30/02 |

(Continued)

OTHER PUBLICATIONS

Zhu et al., "Determining and Satisfying Search Users Real Needs via Socially Constructed Search Concept Classification", IEEE International Conference on Digital Ecosystems and Technologies (IEEE DEST 2007) Caims Australia, Feb. 21-23, 2007, pp. 404-409.

(Continued)

*Primary Examiner* — Mila Airapetian
(74) *Attorney, Agent, or Firm* — Kilpatrick Townsend & Stockton LLP

(57) ABSTRACT

A method and system for analyzing user behavior as users search for items within an electronic marketplace is provided. A query is submitted by a user of the electronic marketplace, the query is processed to identify a series of actions or behaviors performed by the user in relation to the query and fingerprint information for the query is determined based at least in part on analyzing the actions. In one embodiment, the electronic marketplace modifies a user experience for the user based on the fingerprint information. An interactive network region comprising search results related to a query issued by a user is generated, based on fingerprint information. Various categories of items related to a query issued by the user are identified based on fingerprint information and the search results are organized based on categories.

24 Claims, 34 Drawing Sheets

(56) References Cited

U.S. PATENT DOCUMENTS

| | | |
|---|---|---|
| 2007/0088729 A1* | 4/2007 | Baca .................... G06F 9/4443 |
| 2007/0220365 A1 | 9/2007 | Castellani et al. |
| 2007/0250514 A1 | 10/2007 | Rajput et al. |
| 2007/0266002 A1 | 11/2007 | Chowdhury et al. |
| 2008/0228685 A1* | 9/2008 | Shivaji-Rao .......... G06F 9/4443 706/46 |
| 2010/0171993 A1 | 7/2010 | Longobardi et al. |
| 2011/0202522 A1 | 8/2011 | Ciemiewicz et al. |
| 2011/0288909 A1 | 11/2011 | Hedley et al. |
| 2011/0295824 A1 | 12/2011 | Schneider et al. |
| 2012/0054194 A1 | 3/2012 | Gao et al. |
| 2012/0093354 A1* | 4/2012 | Kletter ............... G06K 9/00456 382/100 |
| 2012/0215664 A1* | 8/2012 | Dalal .................... G06Q 30/06 705/27.1 |
| 2012/0303624 A1 | 11/2012 | Gandhi et al. |
| 2013/0055367 A1 | 2/2013 | Kshirsagar et al. |
| 2013/0246383 A1 | 9/2013 | White et al. |
| 2015/0142565 A1* | 5/2015 | Wang ................. G06Q 30/0256 705/14.54 |
| 2015/0227557 A1 | 8/2015 | Holzschneider et al. |

OTHER PUBLICATIONS

U.S. Appl. No. 14/217,003, filed Mar. 17, 2014, Titled: Generation and Classification of Query Fingerprints.

U.S. Appl. No. 14/217,021, filed Mar. 17, 2014, Titled: Identifying Query Fingerprints.

U.S. Appl. No. 14/217,036, filed Mar. 17, 2014, Titled: Modifying User Experience Using Query Fingerprints.

U.S. Appl. No. 14/290,826, filed May 29, 2014, Titled: Generating Modified Search Results Based on Query Fingerprints.

U.S. Appl. No. 14/290,829, filed May 29, 2014, Titled: Category Ranking on Query Fingerprints.

\* cited by examiner

FIG. 7

Your search: "games"

1-16 of 4,508,237 results      Sort of Bestselling ▼

| ‹ | Video Games | Apps for Mobile Platform | E-book Reader Store | Toys & Games | Books | Electronics | › |

Best Sellers for "games"

| Drivers Without Seatbelts VI | Drivers Without Seatbelts VI<br>By DMV Studios<br>$59.99 Video Game 5 *Prime*<br>Available for Pre-order.<br>This item will be released Sep. 17, 2013 | Board Games<br>Card Games<br>Grown-Up Toys<br>Game Accessories<br>Play Vehicles<br>Maze & Sequential Puzzles<br>Electronics for Kids<br>+ See more | Plug & Play Video Games<br>Electronic Software & Books<br>Electronic Toys<br>RC Figures & Robots<br>Kid's Electronic Learning & Education Systems<br>Electronic Pets<br>+ See more | ces<br>(2 offers) |

| 2-piece Jigsaw | 2-Piece Jigsaw<br>By Toys for Under Twos<br>$8.90 $13.99<br>Order in next 72 hours to get it by Tue. Apr. 9<br>Eligible for free super-saving shipping | ★★★★★ 862<br>Manufacturer recommended Age: 7-12 Years | More Buying Choices<br>New from $23.99<br>(123 offers) |

| The Crazy Laundry Game! | The Crazy Laundry Game<br>By TCLG<br>$12.95 $21.99 PC Game<br>Order in next 18 hours to get it by Tue. Sep. 3<br>*Only 9 left in stock* | ★★★★★ 39<br>ESRB Rating: Teen | More Buying Choices<br>New from $9.31<br>(29 offers)<br>Used from $7.25<br>(20 offers) |

| Tic Tac WHO? | Tic Tac Who?<br>By Microlaughs<br>$17.99 $19.99 Xthing *Prime*<br>Order in next 72 hours to get it by Tue. Apr. 9<br>Eligible for free super-saving shipping | ★★★★★ 197<br>ESRB Rating: Teen | More Buying Choices<br>New from $17.79<br>(64 offers)<br>Used from $17.00<br>(9 offers) |

| Spot the Club!! | Spot the Club!<br>By Club Masters<br>$25.00 *Prime*<br>Order in next 72 hours to get it by Tue. Apr. 9<br>Eligible for free super-saving shipping | ★★★★★ 126<br>Manufacturer recommended age: 7-12 Years | More Buying Choices<br>New from $25.00<br>(7 offers) |

| Hit Kitten! Mission III | Hit Kitten III By SPCYAY<br>$17.99 Thinguando *Prime*<br>Order in next 72 hours to get it by Tue. Apr. 9<br>Eligible for free super-saving shipping | ★★★★★ 126<br>ESRB Rating: Everyone 10+ | More Buying Choices<br>New from $35.79<br>(404 offers)<br>Used from $133.00<br>(93 offers) |

| Chess Meets Checkers | Chess Meets Checkers | | |

FIG. 8

1702 — best home theater system

Your search: ⊗ "best home theater"  ⊗ Electronics  ⊗ Home Theater Systems
1-16 of 989 results                    Show Filters ▼ | Sort by Most Popular ▼ | View as ▦▦

| #1 Best Seller | Top Reviewed | Most Wished For | Special Offer |
|---|---|---|---|
| HT-S3500 5.1-Channel Home Theter Speaker/ Receiver $279.00 $251.89 ★★★★★ | HTS3564/F7 3D 5.1 Home Theatre $128.00 $151.89 ★★★★★ | SC-XH170 Energy Star 5.1-Channel Home Theater $248.00 $251.89 ★★★★★ | HT-F4500 3D Home Theater System $497.00 $4531.89 ★★★★★ |
| HT-S3500 | DAVTZ140 | SC-XH170 | HT-F4500 |
| ★★★★★ 354 ▼ | ★★★★★ 764 ▼ | ★★★★★ 14 ▼ | ★★★★★ 213 ▼ |
| $279.00 $251.89 In Stock Ships from and sold by Company Order in the next 6 hours and get it by Fri, May 24 | $128.00 $151.29 In Stock Ships from and sold by Company Order in the next 6 hours and get it by Fri, May 24 | $248.00 $251.29 In Stock Ships from and sold by Company Order in the next 6 hours and get it by Fri, May 24 | $497.00 $531.29 In Stock Ships from and sold by Company Order in the next 6 hours and get it by Fri, May 24 |
| Welcome to Immersive, Affordable and Complete Home Theater. For small- to medium-sizsed rooms, you can't go past the well-balanced and affordable HT-S3500 home theater package. | Experience music in powerful 1000W surround sound at home. Enjoy the best of internet on your TV with A and B, hassle-free with speedy built-in Wi-Fi-n and playback more than ever before. | The SC-XH170 features new high sound quality technology for pure, clear sound reproduction in a sophisticated and stylish appearance. Link to your Player 1 or Phone 1 for a variety of entertainment besides movies. | Welcome to Immersive, Affordable and Complete Home Theater. For small-to medium-sized rooms, you can't go past the well-balanced and affordable HT-S3500 home theater package. |
| • 4 HDMI inputs • WRATAmplifier Technology • USB Port of Player 1/ Phone 1 • TrueHD, DTS-HD | • 4 HDMI inputs • WRATAmplifier Technology • USB Port of Player 1/ Phone 1 • TrueHD, DTS-HD | • 4 HDMI inputs • WRATAmplifier Technology • USB Port of Player 1/ Phone 1 • TrueHD, DTS-HD | • 4 HDMI inputs • WRATAmplifier Technology • USB Port of Player 1/ Phone 1 • TrueHD, DTS-HD |
| • Buy Used and Save • Six-Month Financing | • Six-Month Financing | • Buy Used and Save • Six-Month Financing | • Extra Special offer lorem ipsum deal • Buy Used and Save • Six-Month Financing |
| Full Product Details ▶ | Full Product Details ▶ | Full Product Details ▶ | Full Product Details ▶ |

( Collapse )

GENERATING CATEGORY LAYOUTS BASED ON QUERY FINGERPRINTS

CROSS-REFERENCE TO RELATED APPLICATIONS

This application is a continuation in part of U.S. patent application Ser. No. 14/217,003, filed Mar. 17, 2014, entitled "GENERATION AND CLASSIFICATION OF QUERY FINGERPRINTS", and is also a continuation in part of U.S. patent application Ser. No. 14/217,021, filed Mar. 17, 2014, entitled "IDENTIFYING QUERY FINGERPRINTS", and is also a continuation in part of U.S. patent application Ser. No. 14/217,036, filed Mar. 17, 2014, entitled "MODIFYING USER EXPERIENCE USING QUERY FINGERPRINTS".

This application is related to and incorporates by reference for all purposes the full disclosure of U.S. patent application Ser. No. 14/290,826, filed May 29, 2014, entitled, "GENERATING MODIFIED SEARCH RESULTS BASED ON QUERY FINGERPRINTS" and U.S. patent application Ser. No. 14/290,829, filed May 29, 2014, entitled, "CATEGORY RANKING BASED ON QUERY FINGERPRINTS".

BACKGROUND

It has become common for merchants to utilize an electronic forum that provides users with the ability to view and/or purchase items using an electronic catalog of items. As an example, users may view information related to an item in an electronic catalog by simply submitting a search query for the item via a search engine. The search query may typically include a set of words or phrases that a user enters when looking for information about a specific item. Oftentimes it is not easy for a user to choose query terms that specifically represent information about an item. As a result, users tend to modify their initial queries and submit new ones that more accurately reflect their information needs. In addition, users may also narrow or broaden their queries during a search session in the hope of getting better search results.

BRIEF DESCRIPTION OF THE DRAWINGS

Various embodiments in accordance with the present disclosure will be described with reference to the drawings, in which:

FIG. 7 is a schematic diagram depicting an example graphical user interface by which a user can search for an item within an electronic marketplace, described herein.

FIG. 8 is a schematic diagram depicting an example graphical user interface by which a user can search for an item within an electronic marketplace, described herein.

FIG. 17 is an exemplary illustration of modified search results presented to a user based on identifying comparison terms in a query, in accordance with one embodiment of the present disclosure.

DETAILED DESCRIPTION

Figure 1:
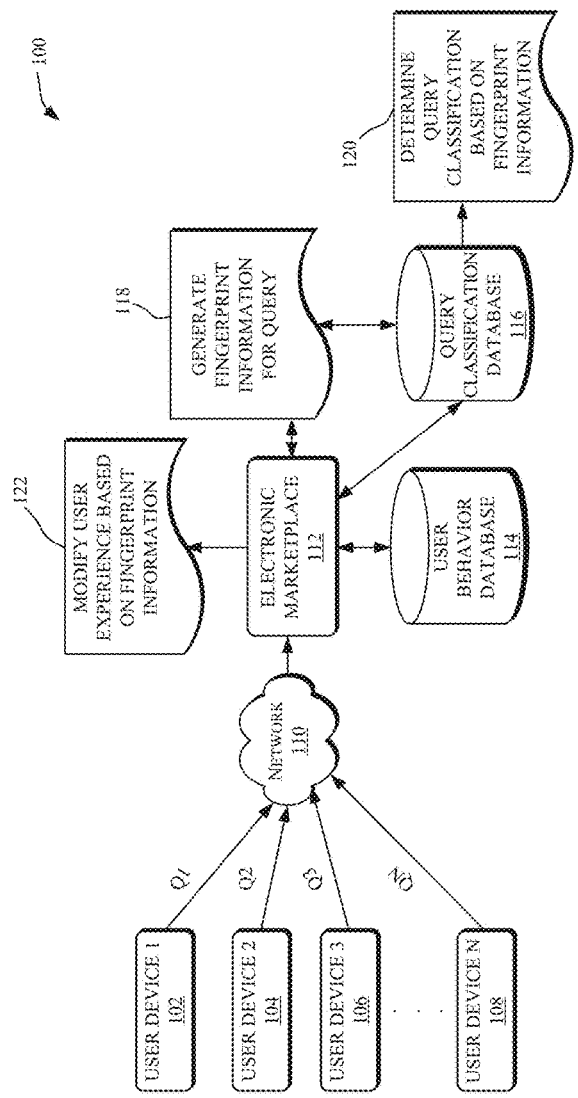
FIG. 1 depicts aspects of an example system architecture 100 in accordance with at least one embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the processes described herein, or variations and/or combinations thereof may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques described herein include a method and system for analyzing user behavior as a user searches for items, for example within an electronic marketplace. In accordance with at least one embodiment, a query is submitted by a user of the electronic marketplace, the query is processed to identify one or more actions or behaviors performed by the user in relation to the query and fingerprint information for the query is determined based at least in part on the query and the one or more actions or behaviors. In some embodiments, a user experience for the user is modified based at least in part on the fingerprint information.

In some examples, the actions performed by a user in relation to a query may include, without limitation, a re-formulation of the query, a term swap, a term addition, a term deletion, an abandonment of the query, an item detail page click, a refinement of the query, a scope change of the query, and the like. For example, a re-formulation, a refinement or a scope change of a query may include a modification to search terms of the query by the user. Similarly, a term addition may include the addition of one or more search terms to a query. A term deletion may include the removal of one or more search terms to a query. An item detail page click may include the selection of an item in the electronic catalog by the user, to view details about the item. As an example, an item detail page may include details that characterize an item offered for sale in the electronic marketplace and may include information that assists users (e.g., buyers) to decide between multiple alternative offers related to the item. Query abandonment may include an abandonment of the query by the user.

In accordance with at least one embodiment, a plurality of fingerprints are analyzed to form a classification system or database of fingerprints. In one embodiment, a fingerprint for a query may be represented as a vector of features comprising fingerprint information. The fingerprint information may, in some examples, identify one or more actions performed by users in relation to a query during a search session. In other examples, the fingerprint information may also identify time information. The time information may, in some examples, represent an average amount of time spent by one or more users while browsing for information during a search session. Using this classification system or database, a new query can be classified within the classification system and handled accordingly, for example by anticipating actions of a user that submitted the query and modifying the user's experience accordingly.

In certain embodiments, a user may, via a computing device, submit a search query for an item to a search engine provided by an electronic marketplace website. The electronic marketplace may receive the query submitted by the user and access a classification database having fingerprint information. In one example, the electronic marketplace may then determine fingerprint information for the query by comparing the fingerprint information in the classification database to an action performed by the user in relation to the query. In one embodiment, the electronic marketplace may then determine a classification for the query based on the fingerprint information. In some embodiments, the electronic marketplace may modify a user experience for the user based at least in part on the fingerprint information.

Modifying a user's experience, in some examples, may include modifying search results presented to the user by arranging items of the search results in accordance with one or more layouts and/or views based on query fingerprint information. Modifying search results may include generating an interactive network region comprising the search results related to a query issued by a user, based on fingerprint information. In some examples, modifying search results may include identifying various categories of items related to a query issued by the user based on fingerprint information, organizing the search results based on categories, ordering the categories based on fingerprint information and identifying a subset of items related to a subset of categories (e.g., the most popular categories) in the search results.

In at least one limiting example, a user on a computing device interacts with an electronic marketplace website via a browser application on the computing device by submitting a query (e.g., 'Shoes') via a search interface provided by the electronic marketplace website. The electronic marketplace may identify a subsequent action that the user is likely to perform in relation to the query 'shoes' based on fingerprint information stored in the classification database. As an example, the electronic marketplace may identify that a subsequent action may be a 'term addition' to the query that describes, for example, additional characteristics of the query 'Shoes' such as a color, size, particular brand of the shoes and the like. In one embodiment, the electronic marketplace may dynamically modify search results presented to the user to include items related to these additional characteristics. In one example, the search results presented to the user may be modified by arranging the items of the search result as a 'list' of scrollable items, based on the fingerprint information. In other examples, the search results presented to the user may be modified by arranging the items of the search result in a two-dimensional, scrollable 'grid' layout, based on the fingerprint information or by displaying 'images' of the items of the search result, based on the fingerprint information.

In at least one limiting example, a user on a computing device interacts with an electronic marketplace website via a browser application on the computing device by submitting a query (e.g., 'Games) via a search interface provided by the electronic marketplace website. The electronic marketplace determines a fingerprint for the query based on fingerprint information stored in the classification database. For example, the fingerprint for the query may indicate a set of actions performed by a plurality of users of the electronic marketplace in relation to the query 'Games' such as, for example, a re-formulation of the query to 'Video Games,' a term addition to the query, such as 'Apps for Video Games,' a term deletion in the query to just, 'Toys and Games,' and so on. In one embodiment, the electronic marketplace may identify various categories related to the query based on the identified search terms, 'Video Games,' 'Apps for Video Games,' Toys and Games' in the query fingerprint and generate an interactive network region comprising a 'filmstrip' of categories related to the query based on these search terms. In embodiments, the electronic marketplace may modify the search results presented to the user by providing information for rendering a network page comprising the various identified categories arranged in a 'filmstrip' to the user based on the query fingerprint.

In at least one limiting example, a user on a computing device interacts with an electronic marketplace website via a browser application on the computing device by submitting a query (e.g., 'Best home theater system') via a search interface provided by the electronic marketplace website. In accordance with one embodiment, the electronic marketplace may identify the term 'Best' in the query as a comparison term and identify a list of comparable items related to the query based on fingerprint information related to the query. For example, the electronic marketplace may determine that fingerprint information related to the query 'Best home theater system' includes one or more re-formulations of the query to 'Top reviewed home theater systems,' 'Most reviewed for home theatre systems,' and the like. In one embodiment, the electronic marketplace may identify terms such as 'Top,' 'Most reviewed,' and the like as comparison terms and generate an interactive network region comprising a 'filmstrip' of information that identifies a list of comparable items such as '#1 Best Seller,' 'Top Reviewed,', 'Most Wished For,' and 'Special Offer,' home theater systems, based on the fingerprint information.

In at least one limiting example, a user on a computing device interacts with an electronic marketplace website via a browser application on the computing device by submitting a query (e.g., 'Star Wars') via a search interface provided by the electronic marketplace website. In one embodiment, the electronic marketplace may dynamically modify search results presented to the user by identifying theme information in the query and identifying items that correspond to various characteristics of the theme based on the query fingerprint. As an example, the items may include various characteristics of the theme of the query such as 'Movies #,' 'T-shirts #,' 'Collectibles #,', 'Sales& Deals #,' 'Costumes #,' 'Games #,' 'Legos #,' and the like. In some embodiments, the electronic marketplace may be configured to arrange the items in at least one of a grid layout, a list layout or an image layout in a network page rendered to the user based on the theme.

FIG. 1 depicts aspects of an example system architecture 100 in accordance with at least one embodiment of the present disclosure. The architecture 100 includes an electronic marketplace 112 communicatively connected to one or more user computing devices 102, 104, 106 and 108 via a network 110. The electronic marketplace 112 may present items for sale from one or more sellers and facilitate transactions (e.g., financial transactions) with respect to the items. A user of the electronic marketplace 112 may view and/or order items from the electronic marketplace 112 using one or more of the computing devices 102, 104, 106 and 108. In one embodiment, the electronic marketplace 112 may be hosted by one or more service provider computers, described herein. An exemplary implementation of the electronic marketplace in accordance with at least one embodiment is described below in more detail with reference to FIG. 2.

In architecture 100, one or more users (i.e., electronic marketplace consumers or web browser users) may utilize a browser application or other web application on the user computing devices 102, 104, 106 and 108 to interact with an electronic marketplace website which may be hosted, managed, and/or provided by the electronic marketplace 112, described herein. As an example, users may interact with the electronic marketplace website to search for, browse for, or purchase items from the electronic marketplace 112. As described herein, an item may include a physical item of manufacture, a media item, a digital item (for e.g., music, movie or software), and/or a service (e.g., a virtual computer that provides specific services to users) or other items for purchase or selection via a networked environment.

In accordance with at least one embodiment, the electronic marketplace 112 may be configured to perform one or more operations to receive one or more queries Q1, Q2, Q3 . . . Qn issued by one or more users on user computing devices 102, 104, 106 and 108 and store the queries in a user behavior database 114. In one embodiment, the user behavior database 114 may maintain time-stamped search query histories of search queries submitted by users of the electronic marketplace during a search session. In other examples, the user behavior database 114 may also maintain item browse histories and item purchase histories of users of the electronic marketplace. The item browse histories may identify items selected by users for viewing and indicate the date and time for each such item browse event. The item purchase histories may identify all the items purchased by users of the electronic marketplace and the associated dates of purchase.

In one embodiment, the electronic marketplace 112 may access the search query histories stored in the user behavior database 114 to identify a query submitted by users of the electronic marketplace. The electronic marketplace 114 may then perform one or more operations to identify a series of actions performed by the users in relation to the query during a search session. The actions may include, for example, a re-formulation of the query, a term swap, a term addition, a term deletion, an abandonment of the query, an item detail page click, a refinement of the query, a scope change of the query, and the like. The electronic marketplace 114 may then generate fingerprint information for the query 118 based at least in part on analyzing the actions.

In certain embodiments, the fingerprint information for each query may be stored in a query classification database 116. In accordance with at least one embodiment, the electronic marketplace 112 may be configured to determine a classification for the query 120 based at least in part on the fingerprint information and store the classification information in the query classification database 116. In one example, a query submitted by the user may be classified as a 'Broad' query, a 'Well-defined query', a 'Brand query', and the like based on the fingerprint information. Additional details regarding the generation and classification of fingerprint information related to queries submitted by users of an electronic marketplace is discussed in detail in relation to FIG. 3.

In accordance with at least one embodiment, the electronic marketplace 112 may be configured to perform one or more operations to evaluate a fingerprint for a query and modify a user experience for the user 122 based on the fingerprint. As an example, the electronic marketplace 112 may receive a first query submitted by a user of a user device (e.g., 102). The electronic marketplace may then access a classification database having fingerprint information. In one example, the electronic marketplace may determine fingerprint information for the query by comparing the fingerprint information in the classification database to the action performed by the user in relation to the query. The electronic marketplace may then modify a user experience for the user based at least in part on the fingerprint information. Additional details regarding evaluating a fingerprint for a query modifying a user's experience based on fingerprint information is discussed in detail in relation to FIG. 4.

Figure 2:
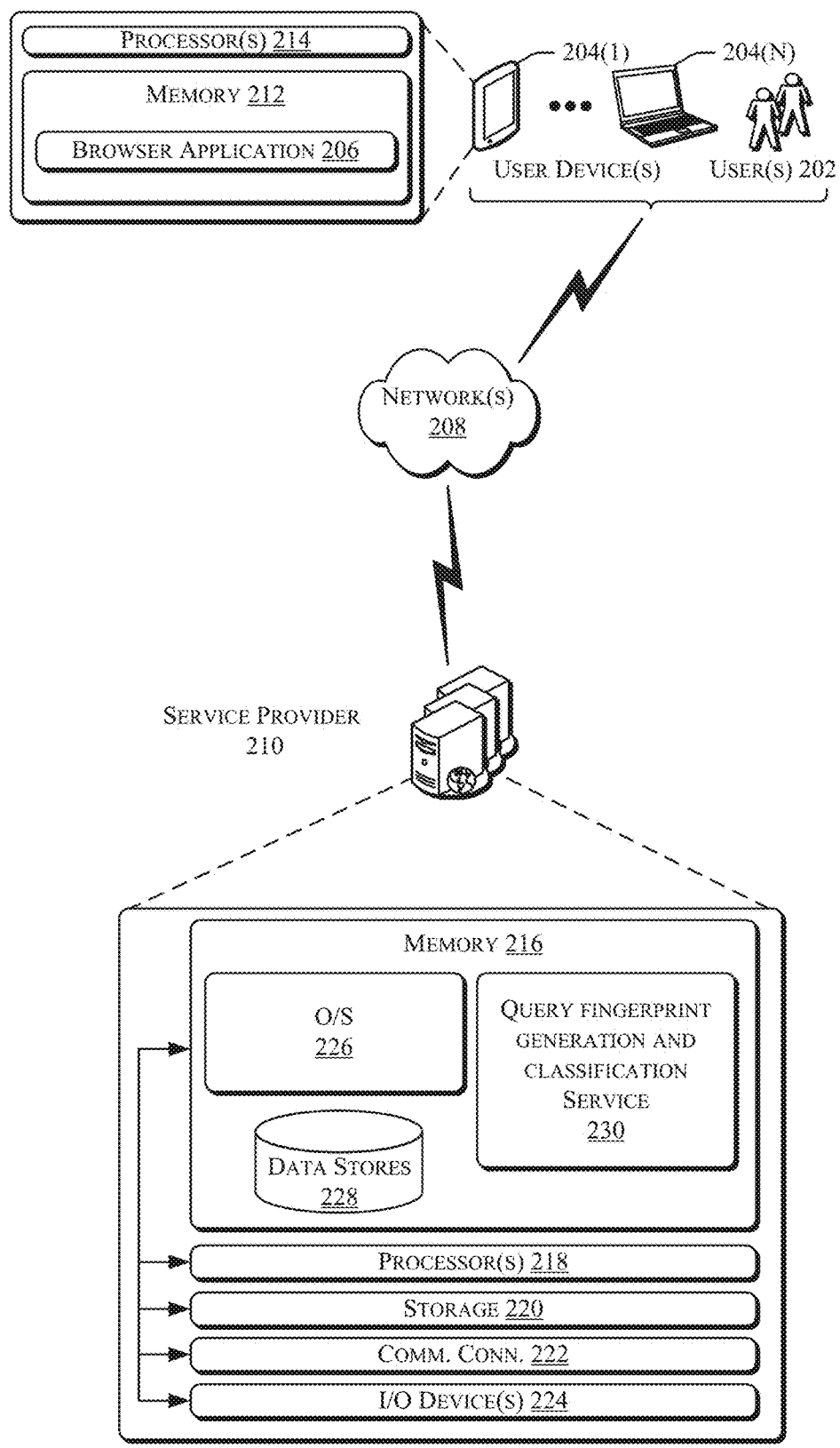
FIG. 2 depicts an illustrative system or architecture 200 that depicts aspects of an electronic marketplace system, described herein.

FIG. 2 depicts an illustrative system or architecture 200 that depicts aspects of an electronic marketplace system, described herein. In architecture 200, one or more users 202 (i.e., electronic marketplace consumers or web browser users) may utilize user computing devices 204(1)-(N) (collectively, user devices 204) to access a browser application 206 (e.g., a web browser) or a user interface accessible through the browser application 206 via one or more networks 208.

In some aspects, the browser application 206 may be configured to receive, store, and/or display a website (e.g., an electronic marketplace website), or other interface on a display screen of the user devices 204. The browser application 206 may be hosted, managed, and/or provided by an electronic marketplace, such as by utilizing the service provider computers 210. In accordance with at least one embodiment, in addition to accessing the browser application 206 to view the electronic marketplace website, the users 202 may also utilize one or more native applications (e.g., a software application program) developed for use on a particular platform compatible with the user devices 204 to access the electronic marketplace website. The one or more service provider computers 210 may, in some examples, provide computing resources such as, but not limited to, data storage, data access, management, virtualization, cloud-based software solutions, electronic content performance management, and the like. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the service provider computers 210 (e.g., via the electronic marketplace website), such as to search for, browse for or purchase items offered by the electronic marketplace, described herein. The one or more service provider computers 210, perhaps arranged in a cluster of servers or as a server farm, may host the electronic marketplace website and/or cloud-based software services. Other server architectures may also be used to host the electronic marketplace website and/or cloud-based software services. The browser application 206 may be capable of handling requests from many users 202 and serving, in response, various user interfaces that can be rendered at the user devices. In one example, the browser application 206 may be capable of receiving search queries from one or more users 204, and in response to the search queries, render network content (e.g., a web page) that includes hypertext information (e.g., information formatted in accordance with a hypertext markup language such as HTML) about an item listed (e.g., offered for sale) in an electronic marketplace system. The browser application 206 can also provide any type of website that supports user interaction, including search engine sites. The described techniques may similarly be implemented outside of the browser application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the service provider computers 210 via the networks 208, or via other network connections. Additionally, the user devices 204 may be part of the distributed system managed by, controlled by, or otherwise part of the service provider computers 210.

In one illustrative configuration, the user devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein, such as via the browser application 206 or dedicated applications (e.g., smart phone applications, tablet applications, etc.). The browser application 206 may be configured to receive, store, and/or display a website (e.g., the electronic marketplace website), or other interface for interacting with the service provider computers 210. In accordance with at least one embodiment, the browser application 206 may receive search queries submitted by the users 202 and provide the search queries to the service provider computers 210. Additionally, the memory 212 may store access credentials and/or other user information such as, but not limited to, user IDs, passwords, and/or other user information.

In some aspects, the service provider computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 210 may be in communication with the user devices 204 and/or other service providers via the networks 208, or via other network connections. The service provider computers 210 may include one or more servers, perhaps arranged in a cluster, as a server farm, or as individual servers not associated with one item detail page rating service described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail and will be described in further detail in FIG. 3, the memory 216 may include an operating system 226, one or more data stores 228, and/or one or more application programs, modules, or services for implementing the features disclosed herein, including a query fingerprint generation and classification service, 230.

Figure 3:
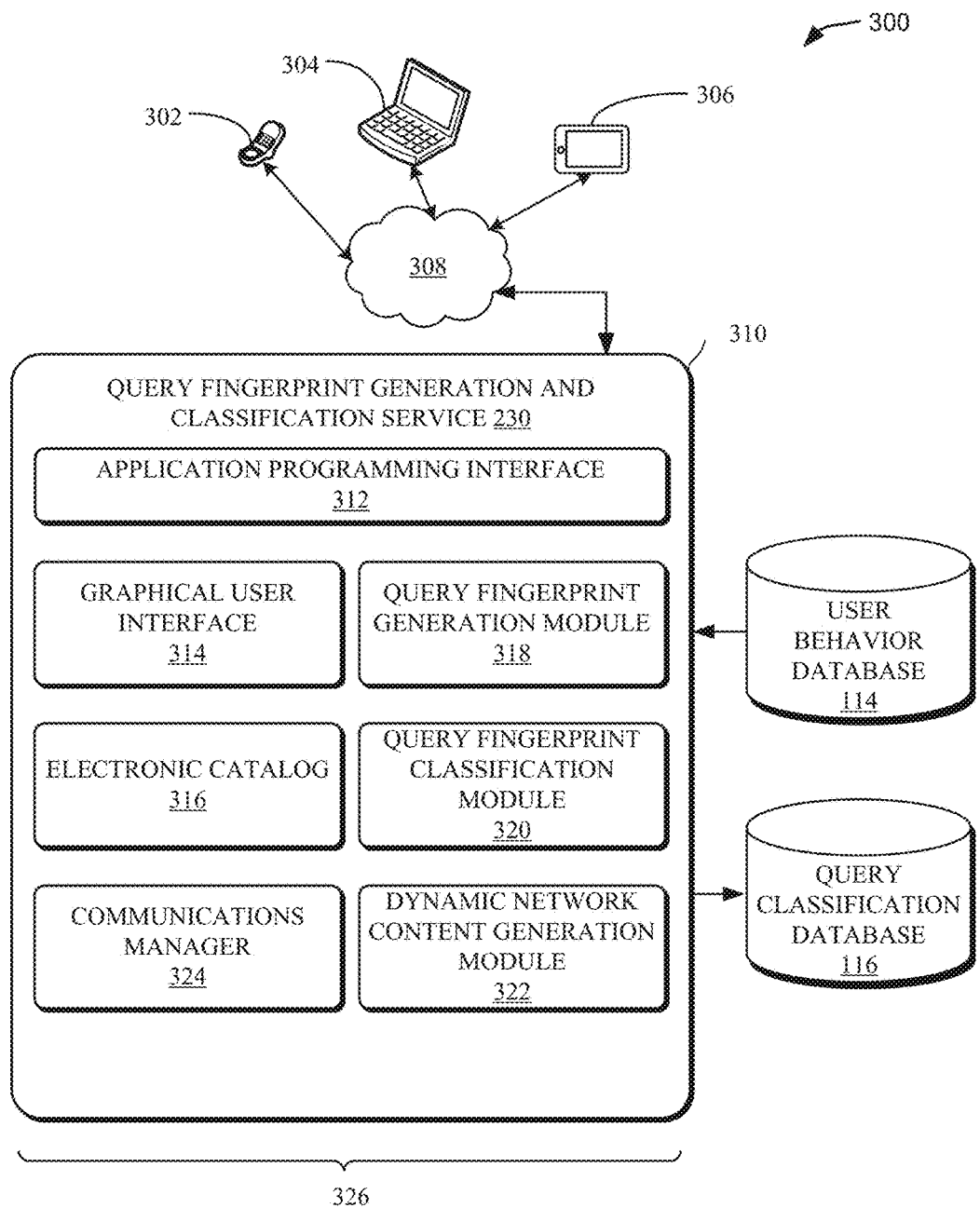
FIG. 3 illustrates an example architecture 300 of a query fingerprint generation and classification service provided by an electronic marketplace 310, in accordance with at least one embodiment of the present disclosure.

FIG. 3 illustrates an example architecture 300 of a query fingerprint generation and classification service provided by an electronic marketplace 310, in accordance with at least one embodiment of the present disclosure. The query fingerprint generation and classification service 230 may include a plurality of modules configured to implement functionality of the query fingerprint generation and classification service, described herein. The modules 326 may be software modules, hardware modules, or a combination thereof. If the modules 326 are software modules, the modules 326 can be embodied on a computer readable medium and processed by a processor in any of the computer systems described herein. It should be noted that any module or data store described herein, may be, in accordance with at least one embodiment, a service responsible for generating fingerprint information for queries related to items issued by users of the electronic marketplace, classifying the generated query fingerprint information and modifying a user experience for the user based on the fingerprint information and the classification of the query. The modules may be configured in the manner suggested in FIG. 3 or may exist as separate modules or services external to the electronic marketplace 310.

In accordance with at least one embodiment, a user may enter and submit search terms into a search query interface via an electronic device communicating with a network 308. The network 308 may be the same or similar as the networks 208 and 110 described above. The electronic device may include, for example, a cell phone 302, a laptop computer 304, or a tablet personal computer 306. User selections may be input by the user or other users, via one of the aforementioned various electronic devices via a web browser application (e.g., 206) on the user's device.

In accordance with at least one embodiment, the query fingerprint generation and classification service 230 may include a graphical user interface 314. The graphical user interface 314 may serve as the back-end component that may be configured to implement the various user interface elements that can be rendered on the user's browser application (e.g., 206) at the user devices. In accordance with at least one embodiment, the graphical user interface 314 may be configured to implement one or more user interface elements to enable users on devices 302, 304 and 306 to interact with the electronic marketplace website while searching for, browsing, or purchasing items via the electronic marketplace 110. As an example, a user may utilize a user interface element to submit a search query to the electronic marketplace. The user may utilize the user interface to view search results related to a query, various categories of information related to the query, and the like. The search query may be received by the communications manager 324 and stored in the user behavior database 114.

In accordance with at least one embodiment, the query fingerprint generation and classification service 230 may include a browsable electronic catalog 316 that is accessible over the network 308 to the users of user devices 302, 304 and 306, via the electronic marketplace website. The electronic catalog 316 may include a database of information about items that may be listed by users within the electronic marketplace system. The information may typically include item IDs, item descriptions and item images provided by manufacturers or distributors of the items. In some examples, information about the items listed in the electronic marketplace system may be viewable by the users of user devices 302, 304 and 306 by browsing the electronic catalog 316 wherein each item may fully be identified within a corresponding item detail page.

In some embodiments, the query fingerprint generation and classification service 230 may include a query fingerprint generation module 318. The query fingerprint generation module 318 may be configured to generate fingerprint information for one or more queries submitted by one or more users of the electronic marketplace. In one embodiment, the query fingerprint generation module 318 may be configured to access search query histories stored in the user behavior database 114 to identify a query submitted by one or more users of the electronic marketplace during a search session. The query fingerprint generation module 318 may perform one or more operations to identify a 'first action' performed by the users in relation to the query. As an example, the 'first action' may correspond to a 'first query' or an 'initial query' (e.g., 'Shoes) submitted by the users. In some embodiments, the query fingerprint generation module 318 may perform one or more operations to store the 'first action' as fingerprint information associated with the query in the query classification database 116.

In accordance with some embodiments, the query fingerprint generation module 318 may then perform one or more operations to analyze a plurality of actions performed by the users in relation to the query, after the 'first action' and identify a 'subsequent action' based at least in part on the analysis. In one example, a 'subsequent action' may be identified as an action that is performed by a maximum number of users after the 'first action.' As an example, the query fingerprint generation module 118 may identify that a 'subsequent action' performed by a maximum number of users after submitting an initial query, 'Shoes' may be a re-formulation of the query to 'Running Shoes.' In certain embodiments, the query fingerprint generation module 318 may perform one or more operations to store the 'subsequent action' as fingerprint information associated with the query in the query classification database 116.

In some embodiments, the query fingerprint generation module 318 may then perform the operations discussed above to identify additional actions performed by the users after the 'subsequent action'. The actions representing the fingerprint information thus identified may be used to generate a fingerprint for the query. In one embodiment, the fingerprint for the query may be represented as a vector of features, in which each feature in the vector represents an action performed by the users in relation to the query. In one embodiment, the last action in the fingerprint for the query may be identified as an 'exit action', indicating the end of the search session and/or an abandonment of the query by the users.

In some embodiments, the query fingerprint generation module 318 may also be configured to track the amount of time that each user spent browsing for information on a particular network page of the electronic marketplace website after submitting the query and before performing a 'subsequent action' that navigated the users to a second network page on the website. In embodiments, the query fingerprint generation module 318 may be configured to store the time information as fingerprint information associated with an action performed by the users in relation to the query.

Thus, in accordance with some embodiments, a fingerprint for a query may be represented by a schema 'S,' the schema comprising one or more attributes or features associated with the query such as time information and one or more actions performed in relation to the query during a search session. Accordingly, a fingerprint for a query may be represented by a schema 'S' as: (<average_amount_of_time_spent_on_page>, <action>), where <action> represents either a 'first action' or one or more 'subsequent actions' performed by the users in relation to the query and <average_amount_of_time_spent_on_page> represents an average amount of time spent by one or more users while browsing for information on a particular page of the website after performing the 'first action' and before performing a 'subsequent action' that navigated the users to the second page on the website. As an example, a fingerprint for a query may comprise fingerprint information such as <first query, 15 mins>, <re-formulation, 15 minutes>, <term addition, 10 minutes>, <exit, 0 minutes>.

In accordance with at least one embodiment, the query fingerprint information generation and classification service 230 may include a query fingerprint classification module 320. The query fingerprint classification module 320 may be configured to determine a classification for queries submitted by the users of the electronic marketplace based at least in part on the fingerprint information. In one embodiment, the classification of a query may be determined based at least in part on determining the duration of a search session related to the query, based on the time information in the fingerprint for the query. As an example, a relatively long search session may be indicative of multiple modifications of query terms by users during a search session whereas a relatively short search session may indicate fewer modifications to the query terms by users.

Accordingly, in one example, a query may be classified as a 'Broad Query' if the fingerprint information associated with the query indicates that the total number of actions in the fingerprint for the query and the total amount of time that the users stayed in the electronic marketplace website during the search session related to the query is within a first pre-determined threshold. In another example, a query may be classified as a 'Well-defined Query' if the fingerprint information associated with the query indicates that the total number of actions in the fingerprint for the query and the total amount of time that the users stayed on the electronic marketplace website during the search session related to the query is within a second pre-determined threshold. In other examples, a query may be classified as a 'Brand Query' if the fingerprint information associated with the query indicates brand-related information about the item (e.g., the name of a company which sells the item, product or service). In one embodiment, the pre-determined thresholds may be determined automatically by the electronic marketplace or may be specified by a user.

In other examples, a classification for a query may also be determined based at least in part on computing a similarity measure between the fingerprint information of the query and the fingerprint information of one or more other queries issued by the users of the electronic marketplace. As an example, the query fingerprint classification module 320 may be configured to compute the similarity measure between two queries by comparing the actions in the fingerprint information of the two queries and the order in which the actions appear in the fingerprint information. In accordance with at least one embodiment, the similarity measure may then be determined by assigning a value (e.g., such as 'high', medium' or 'low') to each query based on the comparison. The query fingerprint classification module 320 may be configured to classify queries having a similarity measure of 'low' under a first category, classify queries having a similarity measure of 'medium' under a second category and classify queries having a similarity measure of 'high' under a third category, and so on.

In certain embodiments, the query fingerprint information generation and classification service 230 may be configured to determine a fingerprint for a query issued by a user based at least in part on combining the fingerprint information of one or more queries stored in the query classification database 116. As an example, consider that a user issues a query, 'Men's Running Shoes Size 10.' In one embodiment, the query fingerprint information generation and classification service 230 may determine that the fingerprint information for the query, 'Men's Running Shoes Size 10' exists in the query classification database 116 but is represented by a relatively small amount of data (e.g., the query was issued by a relatively small (1-2) number of users in the system and/or that the fingerprint information is representative of a relatively small (1-2) number of actions performed by the users). In this case, the query fingerprint information generation and classification service 230 may be configured to identify a similar query (e.g., 'Men's Running Shoes') stored in the query classification database 116 having a relatively large amount of data (e.g., the query was issued by a relatively large (>50) number of users in the system and/or that the fingerprint information is representative of a relatively large number (>5) number of actions performed by the users). In some embodiments, the query fingerprint information generation and classification service 230 may then be configured to determine a fingerprint for the query 'Men's Running Shoes Size 10' issued by the user by aggregating the fingerprint information of the query 'Men's Running Shoes Size 10' with the fingerprint information for the query, 'Men's Running Shoes.'

In certain embodiments, the query fingerprint information generation and classification service 230 may include a dynamic network content generation module 322. In some embodiments, the dynamic network content generation module 322 may be configured to modify a user experience for the user based on a query issued by the user and based on fingerprint information related to the query. In one embodiment, the dynamic network content generation module 322 may be configured to perform one or more operations to receive a query issued by a user of a user device (e.g., 302, 304 or 306) and identify if fingerprint information exists for the query in the query classification database 116. If fingerprint information already exists for the query, the dynamic network content generation module 322 may determine a fingerprint for the query based on the fingerprint information in the database 116, and modify a user experience for the user based on the fingerprint. If fingerprint information does not exist for the query in the query classification database 116, then in some embodiments, the dynamic network content generation module 322 may perform one or more operations to access fingerprint information from the query classification database for a query that is similar to the user's query. As an example, a similar query may be defined as a query that may be classified under the same category as the query issued by the user in the electronic catalog. For example, a query (e.g., 'Men's Shoes') may be identified as a query that is similar to a query ('Shoes') submitted by the user, in certain embodiments. In one embodiment, the electronic marketplace may then perform one or more operations to determine a fingerprint for the query based on the fingerprint information and modify a user experience for the user based on the fingerprint.

In accordance with at least some embodiments, the dynamic network content generation module 322 may be configured to dynamically change the appearance of network content in a network page of the electronic marketplace website as the user searches for information about an item in the electronic marketplace website, based on the fingerprint information. Modifying the user experience in some embodiments may include rendering collected network site data (e.g., hypertext markup language, cascading style sheets, programming language instructions such as scripting language instructions) into network document images that may be displayed dynamically on the network page of the electronic marketplace website. In other embodiments, modifying the user experience may also include generating interactive network document regions that may change an appearance of the network page based on the fingerprint information of the query. For example, a 'drop down' menu may be dynamically generated to change the appearance of a network page in response to a user's query and the fingerprint information of the query. As another example, a region with refined search results may be dynamically displayed on the network page based on the fingerprint of the query. As an example, if the dynamic network content generation module 322 determines that users who search for an item 'Games' typically re-formulate their query to 'Video games' based on the fingerprint information, the dynamic network content generation module 322 may automatically modify the search results presented by the user to include 'Video Games' in a top region of the network document when the user submits a query for the item 'Games.'

In certain embodiments, the dynamic network content generation module 322 may be configured to present a personalized search result for the user based on the fingerprint information. As an example, the dynamic network content generation module 322 may be configured to present a personalized search result to the user based on a query issued by the user and based on the fingerprint information related to the query. As an example, the dynamic network content generation module 322 may be configured to generate multiple views and/or layouts by which the user may view search results. For example, a personalized search result may include a search result that is presented in a particular layout and/or a view such as a 'list view', a 'grid view', an 'image view', and the like to the user. A personalized search result may include a search result that is presented in a particular layout and/or view to the user, based on the category of items in the search result, different products presented in the search result, and the like.

In some embodiments, the dynamic network content generation module 322 may be configured to present various categories of items related to the query issued by the user based on the fingerprint information and enable the user to navigate between the various categories of items within a given view and/or layout presented to the user in the search result. In embodiments, the generated views and/or layouts may identify a theme related to the query issued by the user and present various categories related to the theme in the search results.

In certain embodiments, the dynamic network content generation module 322 may be configured to present a subset of items related to a category of items in the search result, based on the fingerprint information of the query. As an example, the dynamic network content generation module 322 may organize search results based on category, order the categories based on fingerprint information and identify a subset of items related to a subset of categories (e.g., the most popular categories) to present to the user in the search result. Additional details of the manner in which the dynamic network content generation module 322 modifies a user experience for the user based on fingerprint information is discussed in FIG. 10 below.

Figure 4:
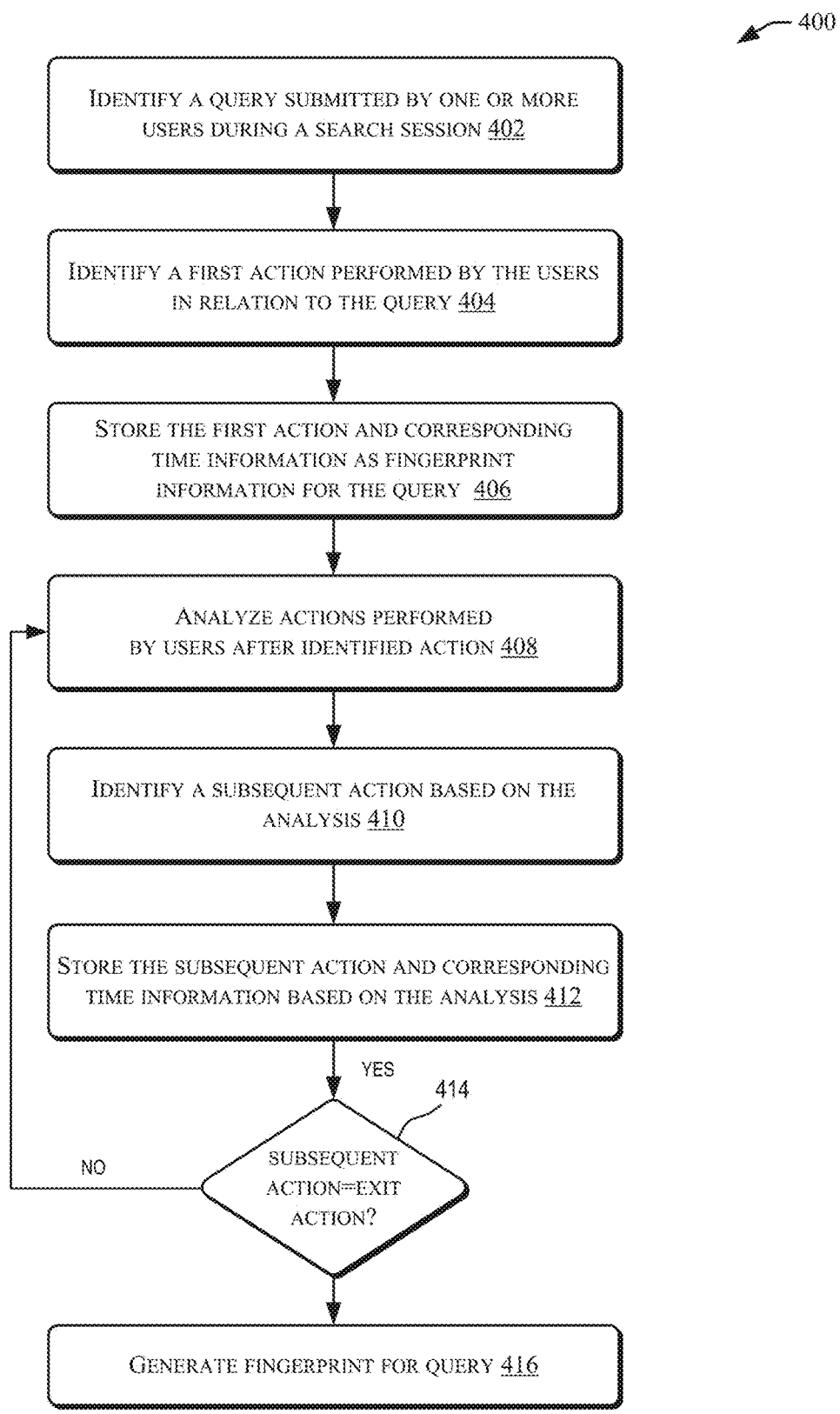
FIG. 4 illustrates a flow diagram of an example process 400 for generating a query fingerprint for one or more queries submitted by users of an electronic marketplace, described herein.
Figure 5:
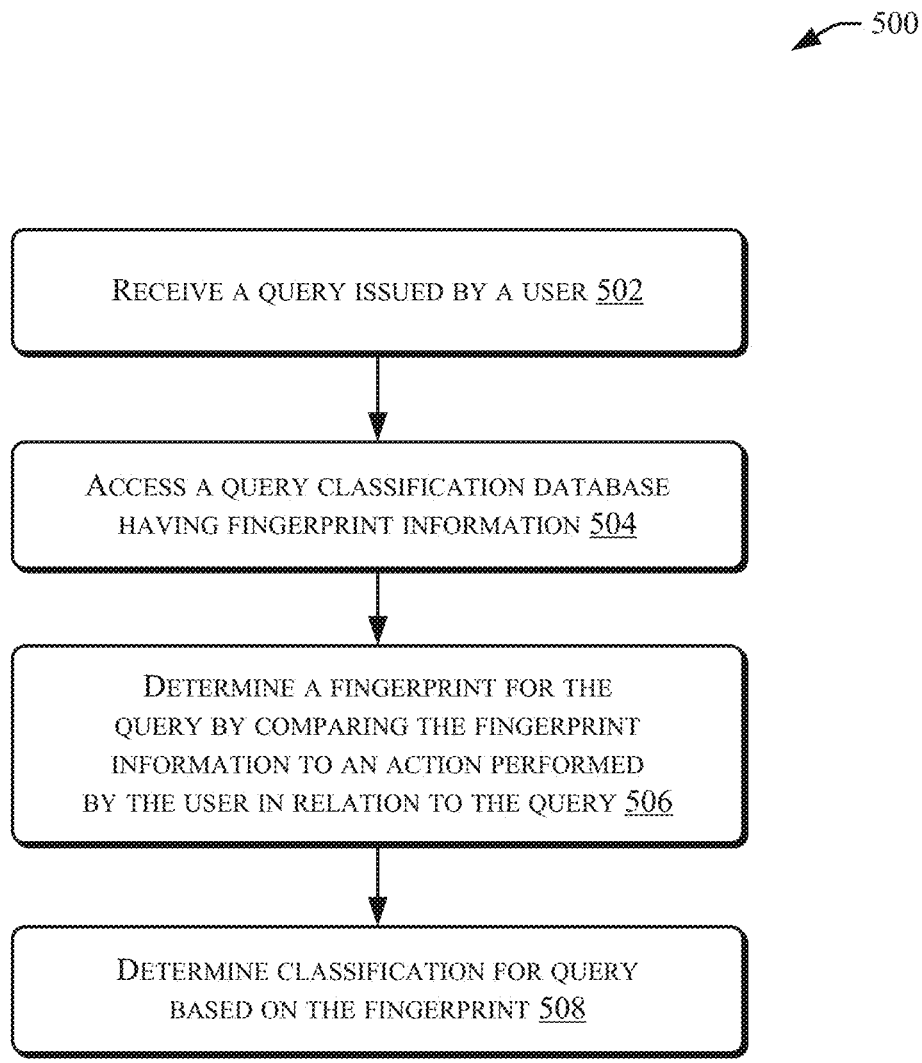
FIG. 5 illustrates a flow diagram of an example process 500 for evaluating fingerprint information for a query submitted by a user and classifying the query based on the fingerprint information, described herein.
Figure 6:
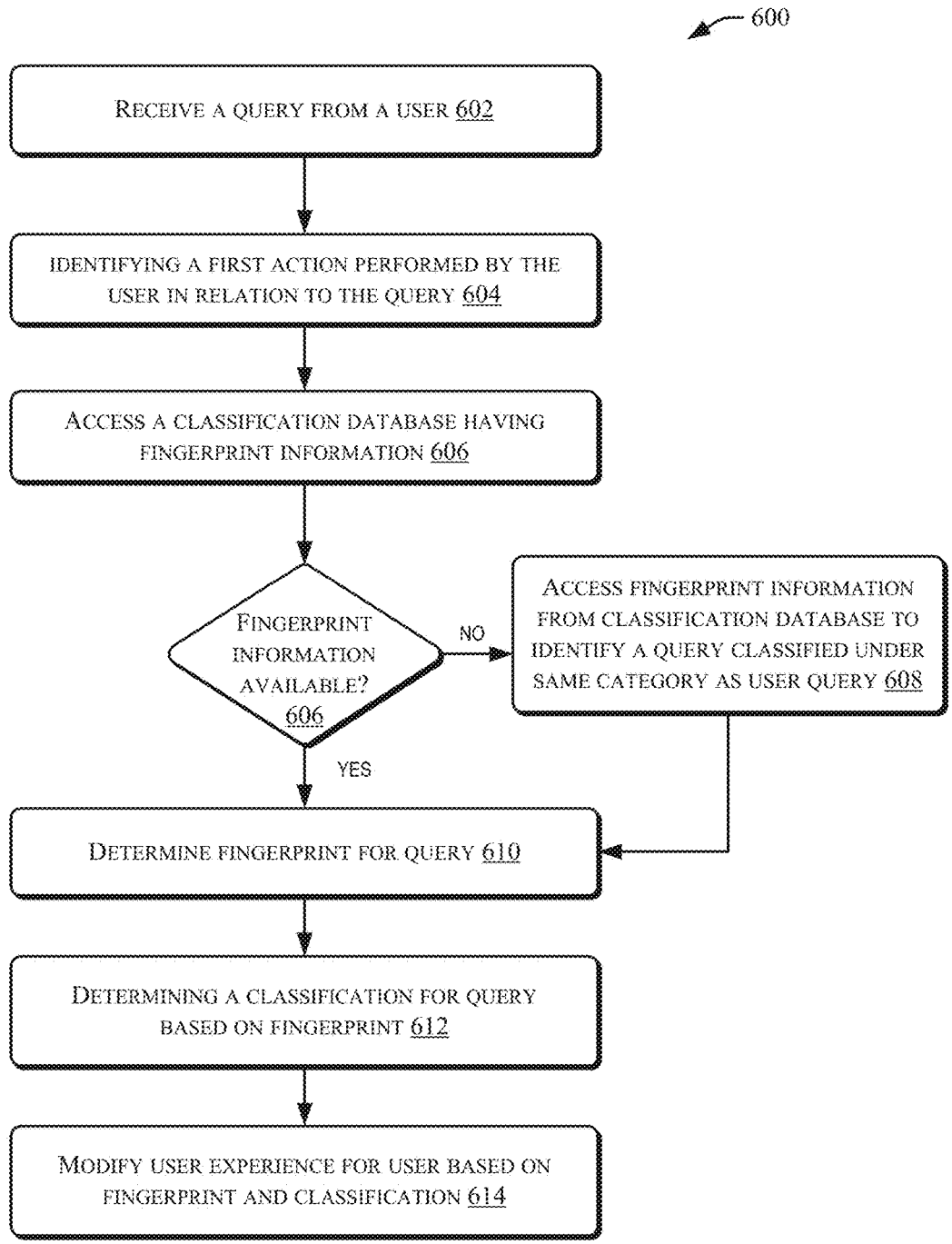
FIG. 6 illustrates a flow diagram of an example process 600 for modifying a user experience for a user for a query submitted by the user based on fingerprint information, described herein.

FIGS. 4-6 illustrate example flow diagrams showing respective processes 400, 500 and 600 for generating and classifying query fingerprints for queries submitted by users of an electronic marketplace, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

In some examples, the query fingerprint generation and classification service 230 (e.g., utilizing at least the query fingerprint generation module 318, the query fingerprint classification module 320 and the dynamic network content generation module 322) shown in at least FIG. 3 (and others) may perform the processes 400, 500 and 600 of FIG. 4, FIG. 5 and FIG. 6 respectively.

FIG. 4 illustrates a flow diagram of an example process 400 for generating a query fingerprint for one or more queries submitted by users of an electronic marketplace, described herein. The process at 400 may begin at 402 by identifying a query submitted by one or more users during a search session. In one example, a query submitted by the users may be identified by accessing user search query histories stored in the user behavior database (e.g., 114). At 404, the process 400 may include identifying a 'first action' performed by the users in relation to the query. As discussed above, a 'first action' may correspond to a 'first query' or an 'initial query' (e.g., 'Shoes) submitted by the users. At 406, the process 400 may include storing the 'first action' as fingerprint information associated with the query in the query classification database 116. In some embodiments, the process at 406 may also include storing time information related to the identified action. As discussed above, the time information may correspond to an average amount of time that one or more users spent browsing for information on a particular page of the website after performing the 'first action' and before performing a 'subsequent action' that navigated the users to a second page on the website.

In some embodiments, at 408, the process 400 may include analyzing a plurality of actions performed by the users in relation to the query, after the identified action (e.g., 'first action'). At 410, the process 400 may include identifying a 'subsequent action' based at least in part on the analysis. At 412, the process 400 may include storing the 'subsequent action' and the time information associated with the 'subsequent action' as fingerprint information associated with the query in the query classification database 116.

At 414, the process 400 may include identifying if the 'subsequent action' corresponds to an 'exit action' performed by the users in relation to the query. In one embodiment, an 'exit action' may correspond to an abandonment of the query by the users or the end of the search session by the users. If the 'subsequent action' is indicative of an 'exit action', then in one embodiment, the process 400 ends at 416, by generating a fingerprint for the query that includes the identified actions. In one embodiment, and as discussed above, the fingerprint information for the query may be represented as a vector of features, in which each feature or attribute corresponds to an action performed by the user in relation to the query and may include time information associated with each action.

At 414, if it is determined that the subsequent action does not correspond to an 'exit' action, then the process 400 continues to 408 to analyze a plurality of actions performed by the users in relation to the query after the identified action.

FIG. 5 illustrates a flow diagram of an example process 500 for evaluating fingerprint information for a query submitted by a user and classifying the query based on the fingerprint information, described herein. The process at 500 may begin at 502 by receiving a query issued by a user of the electronic marketplace. At 504, the process 500 may include accessing a query classification database (e.g., 116) having fingerprint information. In some embodiments, at 506, the process 500 may include determining a fingerprint for the query by comparing the fingerprint information in the query classification database to an action performed by the user in relation to the query. As an example, an action may correspond to an 'initial query' (e.g., 'Shoes') submitted by the user. In one example, the process at 506 may include comparing search terms corresponding to a plurality of queries stored in the query classification database to the search term (e.g., 'Shoes') of the initial query issued by the user. If a search term of a query stored in the query classification database corresponds to the search term of the query issued by the user, then in some embodiments, the process at 506 may include obtaining the fingerprint information of the query stored in the query classification database to determine a fingerprint for the query issued by the user. If the search term of the query issued by the user does not correspond to one or more search terms of queries stored in the query classification database, then in some embodiments, the process at 506 may include obtaining the fingerprint information of a query in the query classification database that is similar to the query issued by the user. A similar query may be determined in various ways. As an example, a similar query may be defined as a query that may be classified under the same category as the query issued by the user in the electronic catalog. For example, a query (e.g., 'Footwear') may be identified as a query that is similar to a query ('Shoes') submitted by the user, in certain embodiments. In one embodiment, the process at 506 may then include determining a fingerprint for the query based on the fingerprint information. At 508, the process 500 may include determining a classification for the query based on the fingerprint.

FIG. 6 illustrates a flow diagram of an example process 600 for modifying a user experience for a user for a query submitted by the user based on fingerprint information, described herein. The process at 600 may begin at 602 by receiving a query submitted by a user of the electronic marketplace. At 604, the process 600 may include identifying a 'first action' associated with the query. As an example, the 'first action' may correspond to the 'first query' or the 'initial query' (e.g., 'Shoes) submitted by the user. At 606, the process 600 may include accessing the query classification database (e.g., 116) having fingerprint information. At 608, the process 600 may include identifying if fingerprint information is available for the query in the query classification database 116.

If fingerprint information already exists for the query, at 610, the process 600 may include determining a fingerprint for the query based on the fingerprint information. If fingerprint information does not exist for the query in the query classification database (e.g., 116), then in some embodiments, the process 600 may include accessing fingerprint information from the classification database (e.g., 116) to identify a query that is classified under a same category as the query issued by the user. As an example, if the user submitted a query ('Shoes') and it is determined that fingerprint information does not exist for the query ('Shoes') in the classification database, then, in some embodiments, the process 600 may access fingerprint information for a query ('Footwear') that is classified under the same category as the query ('Shoes') issued by the user.

At 612, the process 600 may include determining a classification for the query based on the fingerprint. As an example, the process 600 may determine that a query ('Shoes) issued by the user is a 'Broad query' based on the fingerprint information. In one embodiment, at 614, the process 600 may include modifying a user experience for the user based on the fingerprint information and classification. In some embodiments, modifying the user experience may also include identifying a 'subsequent action' based on the fingerprint for the query and dynamically changing the appearance of network content in a network page of the electronic marketplace website based on the 'subsequent action' and the classification of the query. As an example, the process at 614 may identify that a 'subsequent action' for a query, 'Shoes' submitted by a user is a re-formulation of the query based on the fingerprint. In one embodiment, the process at 614 may then perform an operation to dynamically change the appearance of network content in a network page of the electronic marketplace website to display search results related to 'Running Shoes' to the user. Additional details of the manner in which a user experience for a user may be modified based on fingerprint information is discussed in relation to FIGS. 7-9, described herein.

Figure 7:
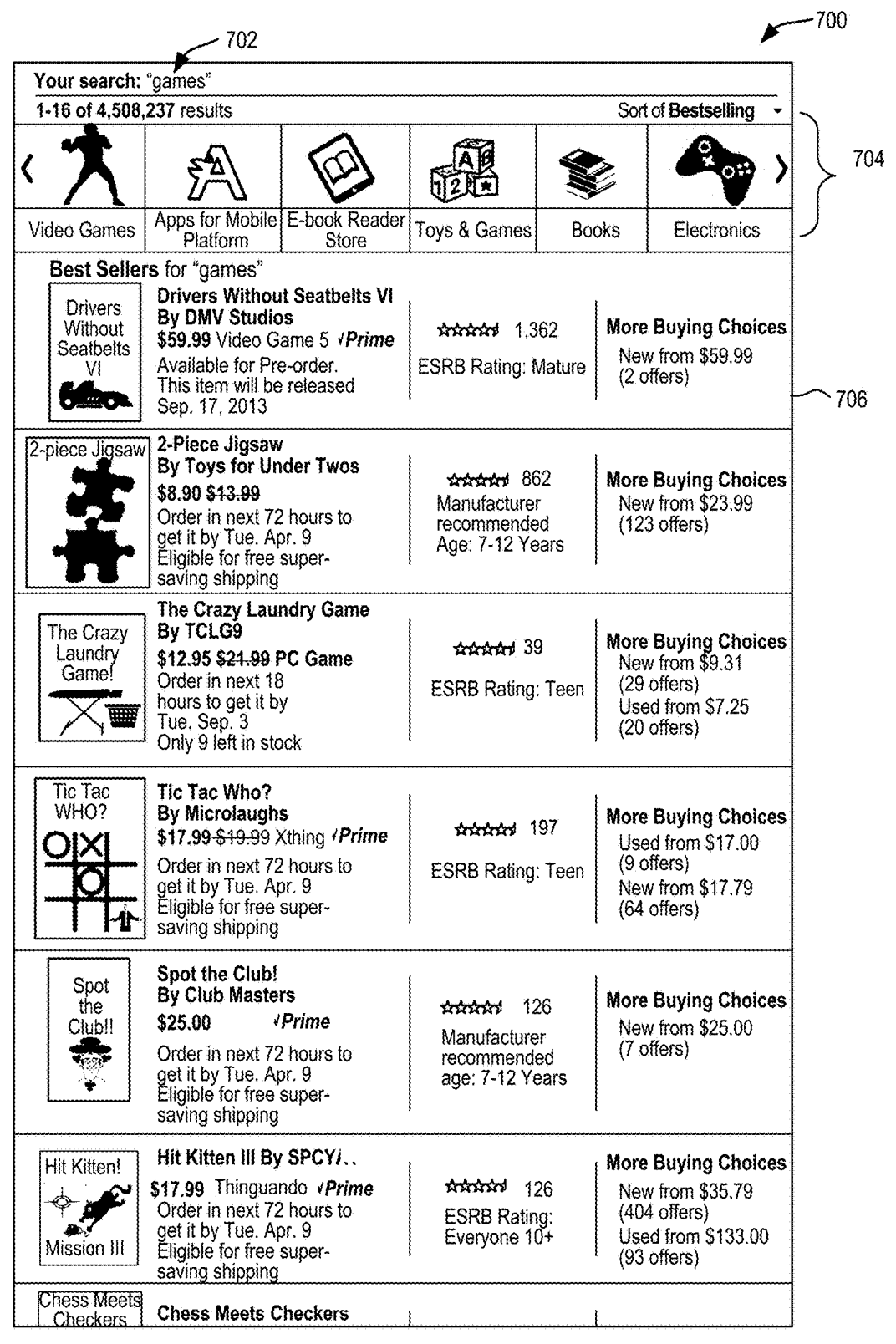

FIG. 7 is a schematic diagram depicting an example graphical user interface by which a user can search for an item within an electronic marketplace, described herein. In FIG. 7, the example environment 700 may be a graphical user interface viewable via a browser application (e.g., via the browser application 206) on the user's device. In the example illustrated in FIG. 7, the user submits a search query "Games' via the search query interface 702 provided by the electronic marketplace website. The electronic marketplace may then identify a subsequent action that the user is likely to perform in relation to the query 'Games' based on the fingerprint information stored in the query classification database. As an example, the electronic marketplace may determine that users who search for the item 'Games' typically re-formulate their query to 'Video games' based on the fingerprint information. In some examples, the electronic marketplace may also determine that the query 'Games' is classified as a 'Broad Query' in the query classification database based on the fingerprint information. In one embodiment, the electronic marketplace may dynamically modify the search results presented to the user to include various categories of 'Video games.' In the example illustrated in FIG. 7, the electronic marketplace modifies the search results presented by the user by dynamically generating and displaying a region 704 with refined search results of various categories of 'Video games' on a network page 706 to the user, based on the fingerprint information and the classification of the query.

FIG. 8 is a schematic diagram depicting an example graphical user interface by which a user can search for an item within an electronic marketplace, described herein. In FIG. 8, the example environment 800 may be a graphical user interface viewable via a browser application (e.g., via the browser application 206) on the user's device. In the example illustrated in FIG. 8, the user submits a search query "Games' via the search query interface 802 provided by the electronic marketplace website. The electronic marketplace may then identify a subsequent action that the user is likely to perform in relation to the query 'Games' based on the fingerprint information and the classification of the query 'Games' from the query classification database. The electronic marketplace may then dynamically modify the search results presented to the user to include 'Video games.' In the example illustrated in FIG. 8, the electronic marketplace may modify the search results presented to the user by dynamically generating and displaying a 'drop down' menu 804 that changes the appearance of the network page 806 in response to the user's query and the fingerprint information of the query to display different categories of 'Video games' to the user.

Figure 9:
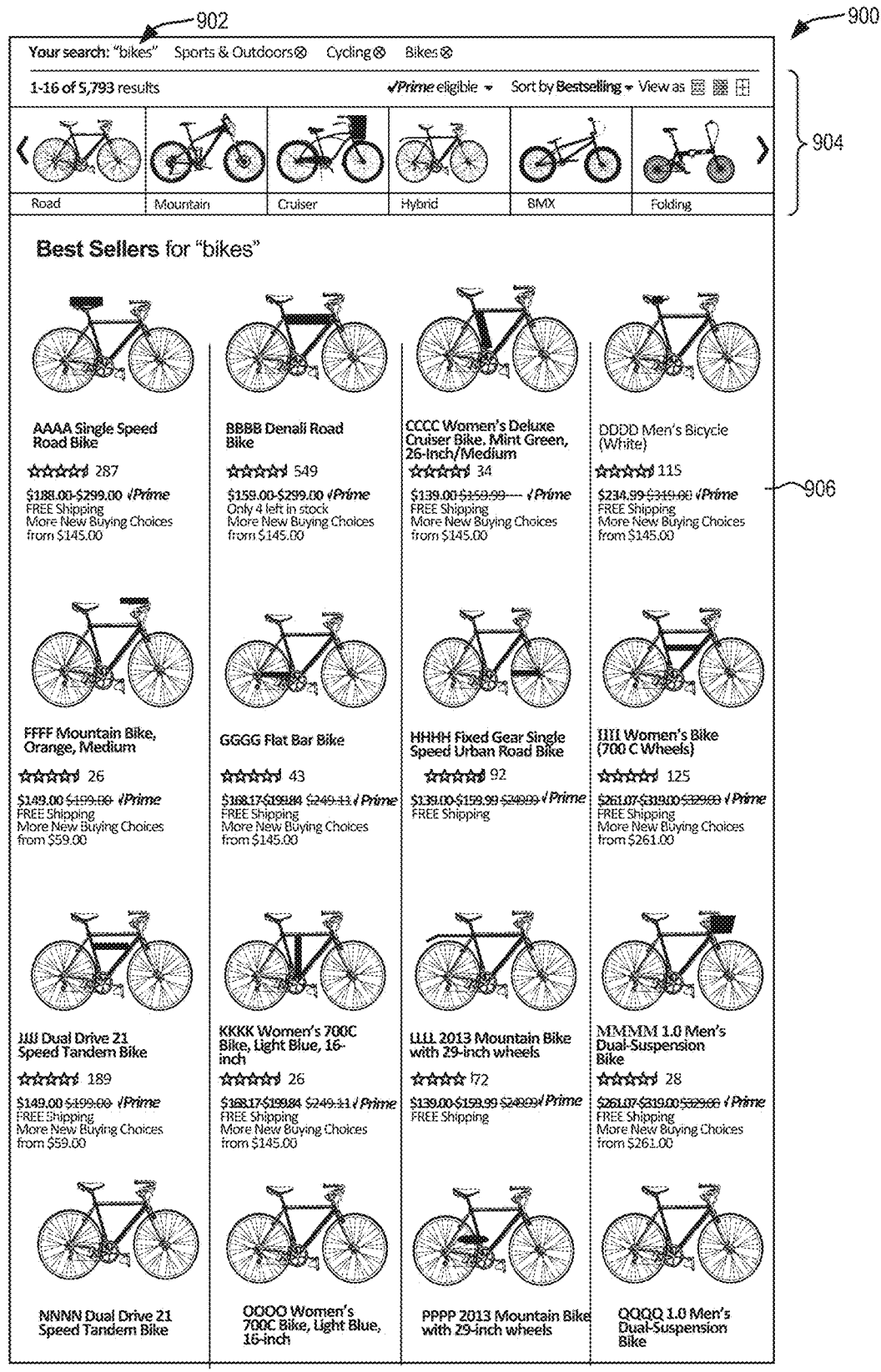
FIG. 9 is a schematic diagram depicting an example graphical user interface by which a user can search for an item within an electronic marketplace, described herein.

FIG. 9 is a schematic diagram depicting an example graphical user interface by which a user can search for an item within an electronic marketplace, described herein. In FIG. 9, the example environment 900 may be a graphical user interface viewable via a browser application (e.g., via the browser application 206) on the user's device. In the example illustrated in FIG. 9, the user submits a search query 'Bikes' via the search query interface 902 provided by the electronic marketplace website. The electronic marketplace may identify a subsequent action that the user is likely to perform in relation to the query 'Bikes' by accessing the fingerprint information and the classification of the query 'Bikes' stored in the query classification database. The electronic marketplace may then dynamically modify the search results presented by the user to include various types of 'Outdoor Bikes' as the user queries for the item 'Bikes' via the search interface. In the example illustrated in FIG. 9, the electronic marketplace may modify the search results presented by the user by dynamically generating and displaying a region 904 with refined search results of various categories of 'Outdoor Bikes' on the network page 906 to the user, based on the fingerprint information.

Illustrative methods and systems for the generation and classification of query fingerprints are described above. Some or all of these systems and methods may, but need not, be implemented at least partially by architectures such as those shown at least in FIGS. 1-9 above. The discussion below relates to methods and systems for modifying search results presented to a user based on query fingerprint information. Some or all of these systems and methods may, but need not, be implemented at least partially by architectures such as those shown at least in FIGS. 10-36 below.

Figure 10:
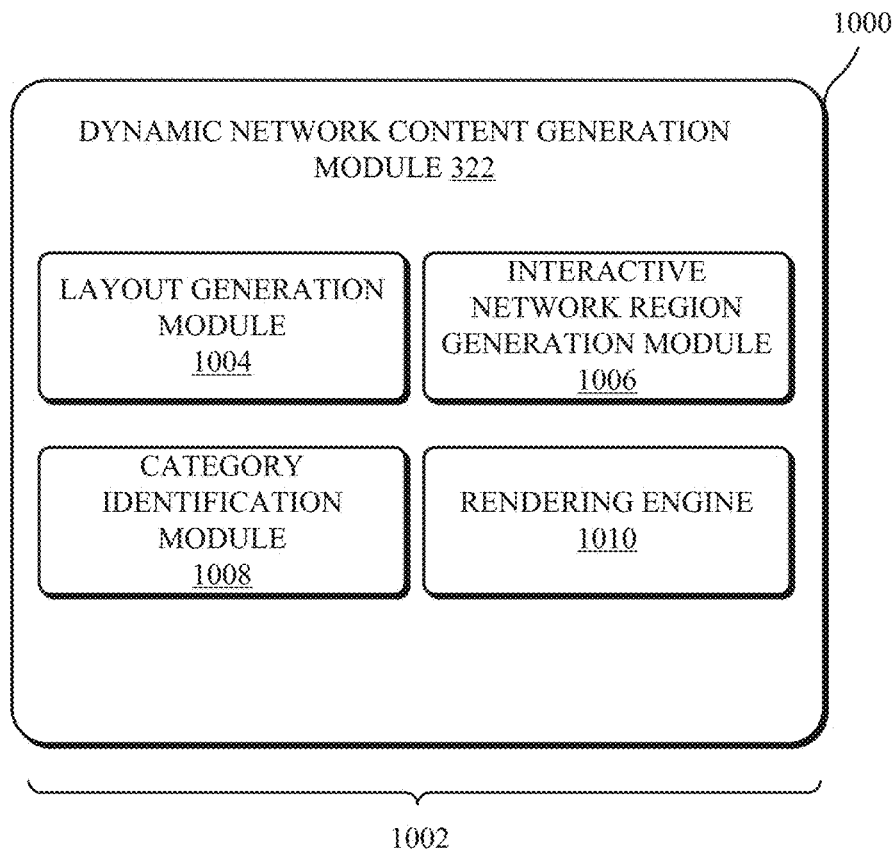
FIG. 10 illustrates an example architecture of the dynamic network content generation module provided by the query fingerprint generation and classification service discussed in FIG. 3, in accordance with at least one embodiment of the present disclosure.

FIG. 10 illustrates an example architecture 1000 of the dynamic network content generation module 322 provided by the query fingerprint generation and classification service discussed in FIG. 3, in accordance with at least one embodiment of the present disclosure. The dynamic network content generation module 322 may include a plurality of modules configured to implement functionality of the dynamic network content generation module 322, described herein. The modules 1002 may be software modules, hardware modules, or a combination thereof. The modules may be configured in the manner suggested in FIG. 1000 or may exist as separate modules or services external to the dynamic network content generation module 322.

In accordance with at least one embodiment, the dynamic network content generation module 322 may include a layout generation module 1004, an interactive network region generation module 1006, a category identification module 1008 and a rendering engine 1010. In some embodiments, and as will be discussed in detail below, the layout generation module 1004, the interactive network region generation module 1006 and the category identification module 1008 may be configured to dynamically modify search results presented to a user based on fingerprint information related to a query. In accordance with at least one embodiment, the rendering engine 1010 may be configured to provide information for rendering a network page comprising the modified search results to the user.

Modifying the search results, in some examples, may include arranging items in the search results presented to the user, in accordance with one or more layouts and/or views based on query fingerprint information. Modifying search results may include generating an interactive network region comprising the search results related to a query issued by a user, based on fingerprint information. In some examples, modifying search results may include identifying various categories of items related to a query issued by the user based on fingerprint information, organizing the search results based on categories, ordering the categories based on fingerprint information and identifying a subset of items related to a subset of categories (e.g., the most popular categories) in the search results.

In accordance with at least one embodiment, the layout generation module 1004 may be configured to dynamically modify search results presented to a user by arranging the items in the search results in at least one of a 'list' layout, a 'grid' layout or an 'image' layout, based on query fingerprint information. In some embodiments, when a user submits a query via a search interface provided by the electronic marketplace, the fingerprint generation module (e.g., 318 shown in FIG. 3) may identify a subsequent action performed by a plurality of users of the electronic marketplace in relation to the query based on fingerprint information stored in the query classification database. The layout generation module 1004 may then dynamically modify search results presented to the user based on the fingerprint information. In one example, the layout generation module 1004 may modify search results presented to the user by arranging items of the search result in a two-dimensional, scrollable 'grid' layout, based on the fingerprint information. In other examples, the layout generation module 1004 may modify search results presented to the user by arranging the items of the search result in a vertical list of scrollable items, based on the fingerprint information. In other embodiments, the layout generation module 1004 may modify search results presented to the user by arranging 'images' of the items of the search result, based on the fingerprint information. In embodiments, the rendering engine 1010 may be configured to provide information for rendering a network page comprising items of the search results arranged in accordance with a layout as discussed above, based on the fingerprint information. The manner in which the layout generation module 1004 may dynamically modify search results presented to a user is discussed in relation to FIGS. 11-13.

Figure 11:
FIG. 11 is an exemplary illustration of modified search results presented to a user in which items of the search results are arranged in accordance with a 'list' layout, based on fingerprint information related to a query.

FIG. 11 is an exemplary illustration of modified search results presented to a user in which items of the search results are arranged in accordance with a 'list' layout, based on fingerprint information related to a query. In FIG. 11, the example environment 1100 may be a graphical user interface viewable via a browser application (e.g., via the browser application 206) on the user's device. In the example illustrated in FIG. 11, a user submits a search query 'phone case' via a search query interface 1102 provided by the electronic marketplace website. The query fingerprint generation module (e.g., 318) may identify a subsequent action that the user is likely to perform in relation to the query 'phone case' based on fingerprint information stored in the query classification database. As an example, the query fingerprint generation module (e.g., 318) may identify that the subsequent action may be a 'term addition' to the query that describes, for example, additional characteristics of the query such as the color of the phone case, the size of the phone case, a particular brand of the phone, and so on. The layout generation module 1004 may then be configured to dynamically modify the search results presented to the user to include items related to these additional characteristics. In the illustrated example shown in FIG. 11, the layout generation module 1004 may modify the search results presented to the user by arranging the items of the search result in a list of scrollable items 1104, based on the fingerprint information.

Figure 12:
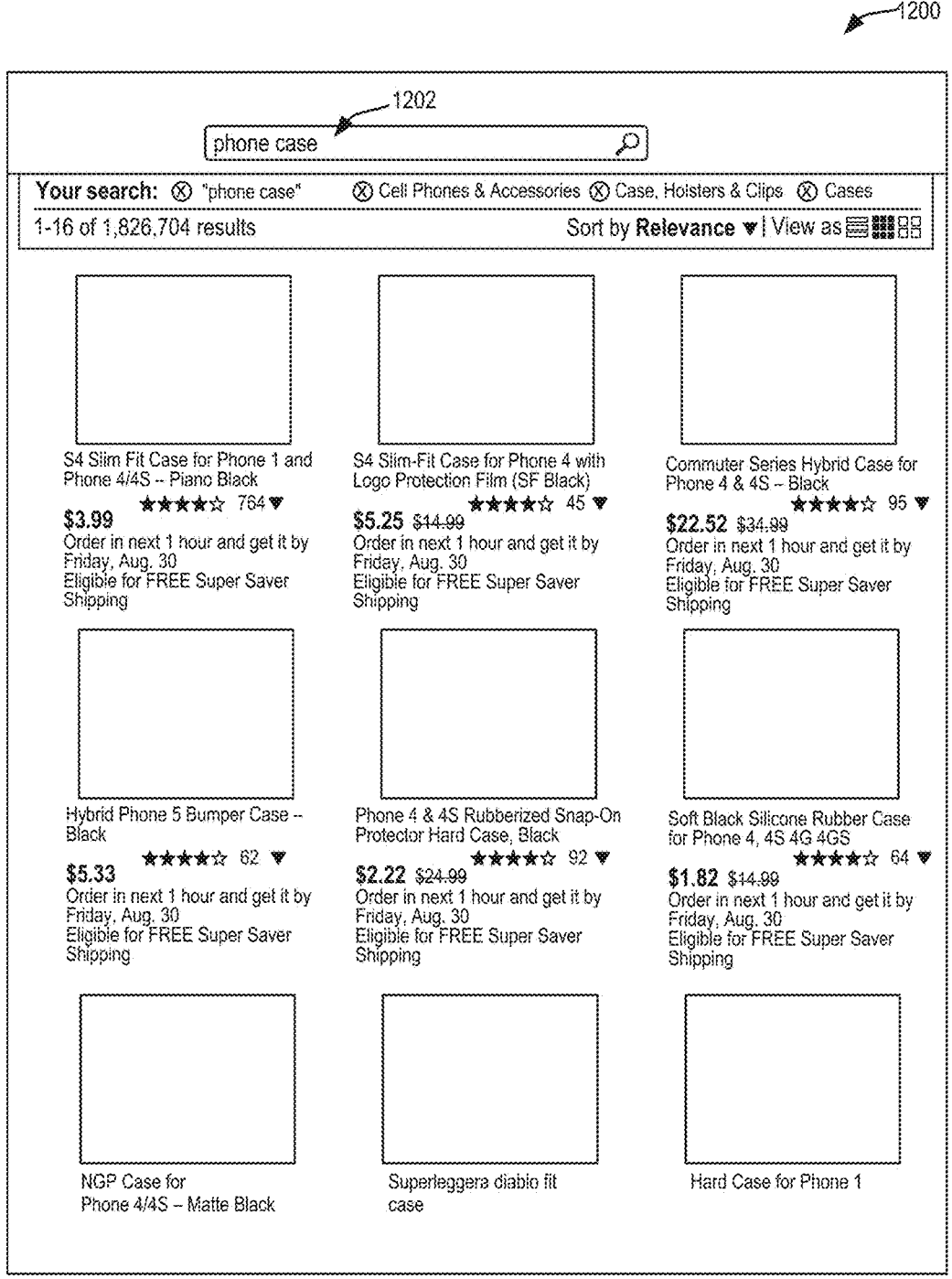
FIG. 12 is an exemplary illustration of modified search results presented to a user in which items of the search results are arranged in accordance with a 'grid' layout, based on fingerprint information related to a query.

FIG. 12 is an exemplary illustration of modified search results presented to a user in which items of the search results are arranged in accordance with a 'grid' layout, based on fingerprint information related to a query. In FIG. 12, the example environment 1200 may be a graphical user interface viewable via a browser application (e.g., via the browser application 206) on the user's device. In the illustrated example, a user submits a search query 'phone case' via a search query interface 1202 provided by the electronic marketplace website. In this example, the layout generation module 1004 may be configured to modify search results presented to the user by arranging items of the search result in a two-dimensional, scrollable 'grid' layout 1204, based on the fingerprint information.

Figure 13:
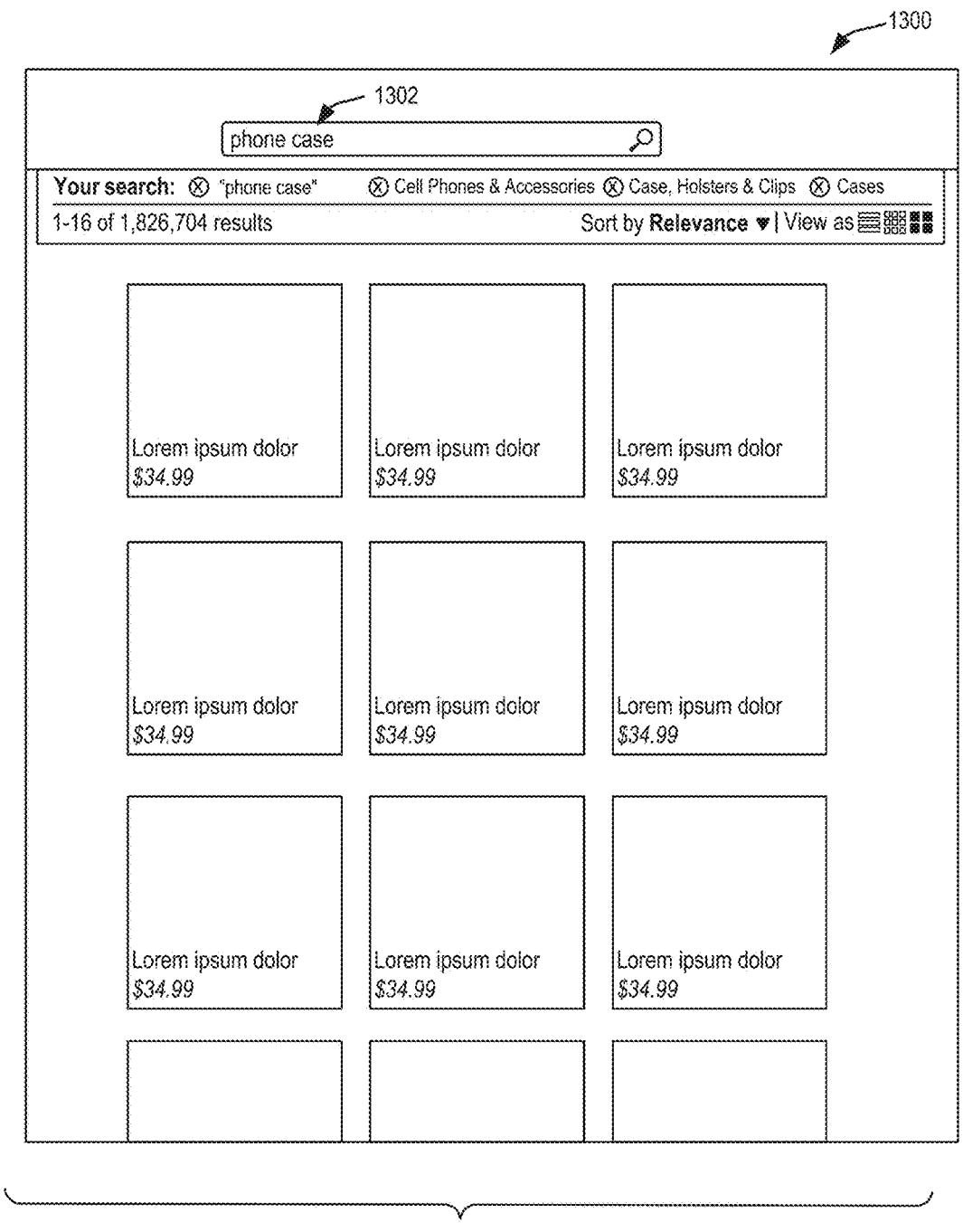
FIG. 13 is an exemplary illustration of modified search results presented to a user in which items of the search results are arranged in accordance with an 'image' layout, based on fingerprint information related to a query.

FIG. 13 is an exemplary illustration of modified search results presented to a user in which items of the search results are arranged in accordance with an 'image' layout, based on fingerprint information related to a query. In FIG. 13, the example environment 1300 may be a graphical user interface viewable via a browser application (e.g., via the browser application 206) on the user's device. In the illustrated example, a user submits a search query 'phone case' via a search query interface 1302 provided by the electronic marketplace website. In this example, the layout generation module 1004 may be configured to modify search results presented to the user by displaying 'images' 1304 of the items of the search result, based on the fingerprint information.

In accordance with at least some embodiments, the dynamic network content generation module 322 may include an interactive network region generation module 1008. In one embodiment, the interactive network region generation module 1006 may be configured to generate an interactive network region in a network page comprising search results related to a query issued by a user, based on query fingerprint information. In one example, the interactive network region generation module 1006 may be configured to generate a 'filmstrip' of information pertaining to various categories related to a query issued by the user. In embodiments, the interactive network region generation module 1008 may be configured to identify the various categories related to a query issued by a user by identifying search terms related to the query based on query fingerprint information. As an example, consider that a user issues a query 'Games' via a search interface provided by the electronic marketplace. The query fingerprint generation module (e.g., 318) may determine a fingerprint for the query based on fingerprint information stored in the query classification database. For example, the fingerprint for the query may indicate a set of actions performed by users in relation to the query 'Games' such as, for example, a re-formulation of the query to 'Video Games,' a term addition to the query, such as 'Apps for Video Games,' a term deletion in the query to just, 'Toys and Games,' and so on. In one embodiment, the interactive network region generation module 1006 may be configured to identify various categories related to the query based on the identified search terms, 'Video Games,' 'Apps for Video Games,' 'Toys and Games' in the query fingerprint and generate an interactive network region comprising a 'filmstrip' of categories related to the query based on these search terms. In embodiments, the rendering engine 1010 may be configured to provide information for rendering a network page comprising the various identified categories arranged in a 'filmstrip' based on the query fingerprint.

In some embodiments, the interactive network region generation module 1006 may be configured to receive, from the user, a selection of a sub-category within the 'filmstrip' of categories in the search results presented to the user. The interactive network region generation module 1008 may then be configured to generate an updated interactive region identifying an updated set of categories, based on the selected sub-category. In embodiments, the interactive network region generation module 1006 may also be configured to generate an updated set of search results corresponding to the updated set of categories. The rendering engine 1010 may be configured to provide information for rendering a network page with the updated set of categories and the updated set of search results to the user.

In accordance with at least some embodiments, the interactive network region generation module 1006 may be configured to generate an interactive network region comprising a plurality of categories related to the query in a network page. The layout generation module 1004 may be configured to arrange a plurality of items comprising search results related to the query in accordance with a layout within each category of the plurality of categories in the interactive network region. The rendering engine 1010 may be configured to provide information for rendering the network page comprising the interactive network region, the plurality of categories identified in the interactive network region and the plurality of items within the plurality of categories arranged in accordance with the layout, to the user.

Figure 14:
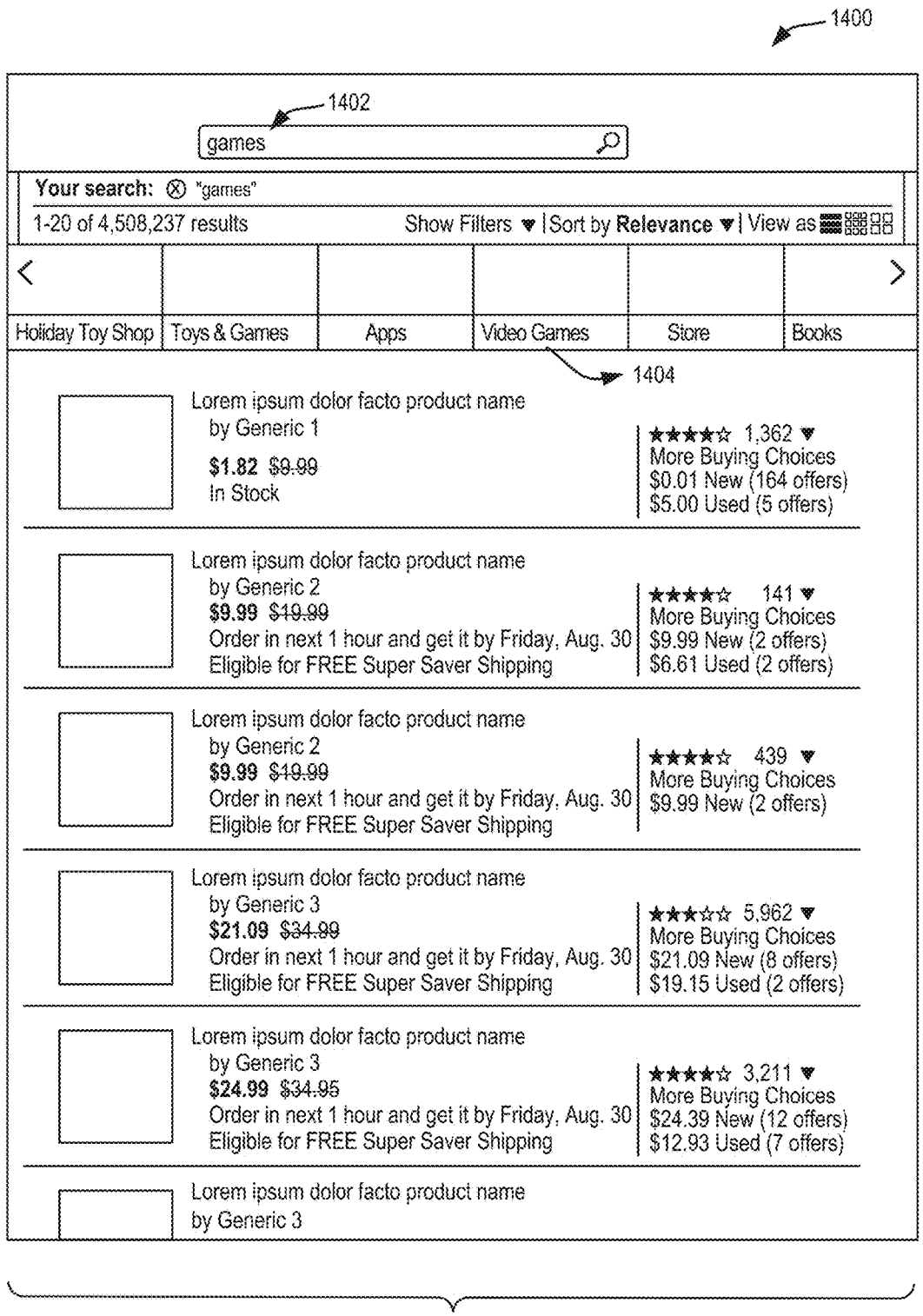
FIG. 14 is an exemplary illustration of modified search results presented to a user in which items of the search results are arranged in a 'filmstrip' of categories based on fingerprint information related to a query.

FIG. 14 is an exemplary illustration of modified search results presented to a user in which items of the search results are arranged in a 'filmstrip' of categories based on fingerprint information related to a query. In FIG. 14, the example environment 1400 may be a graphical user interface viewable via a browser application (e.g., via the browser application 206) on the user's device. In the example illustrated in FIG. 14, a user submits a search query 'games' via a search query interface 1402 provided by the electronic marketplace website. The query fingerprint generation module (e.g., 318) may determine a fingerprint for the query based on fingerprint information stored in the query classification database. The interactive network region generation module 1008 may then identify various categories (e.g., 'Holiday Toy Shop,' 'Toys& Games,' 'Apps,', 'Video Games,' 'Store,' and 'Books,' related to the query based on identified search terms in the query fingerprint as discussed above and generate an interactive network region comprising a 'filmstrip' of categories 1404 related to the query based on the query fingerprint. As further illustrated in FIG. 14, the network page rendered to the user may also include a list of items 1406 pertaining to the search results arranged in a particular layout (e.g., a grid layout, a list layout or an image layout) as discussed in relation to FIGS. 11-13.

Figure 15:
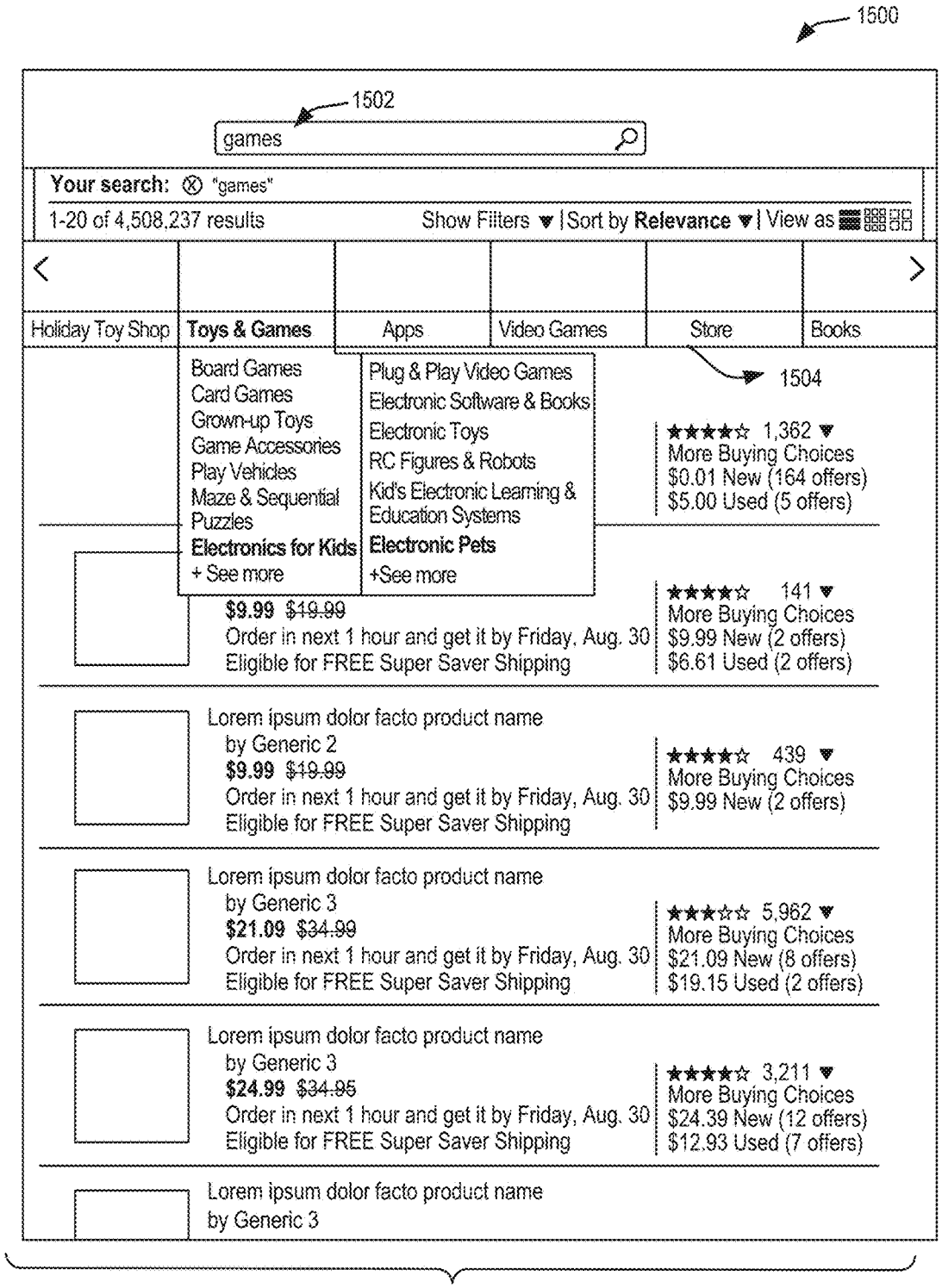
FIG. 15 is an exemplary illustration of modified search results presented to a user in which the user may navigate between various sub-categories in a 'filmstrip' of categories.

FIG. 15 is an exemplary illustration of modified search results presented to a user in which the user may navigate between various sub-categories in a 'filmstrip' of categories. In FIG. 15, the example environment 1500 may be a graphical user interface viewable via a browser application (e.g., via the browser application 206) on the user's device. In the illustrated example, upon submitting a search query 'games' via the search query interface 1502, a user may select a sub-category, "Electronics for Kids' or a sub-category, "Electronic Pets" from the categories displayed in the filmstrip 1504. In one embodiment, and as discussed above, the interactive network region generation module 1008 may generate an updated 'filmstrip' identifying an updated set of categories, based on the selected sub-category. In some embodiments, the interactive network region generation module 1008 may also generate an updated set of search results 1506 corresponding to the updated set of categories.

In accordance with at least some embodiments, the interactive network region generation module 1006 may be configured to identify a search term in the query issued by the user and generate an interactive network region based at least in part on the identified search term. In one example, the identified search term may correspond to a term in the query that may be used to develop a comparison between the term and one or more terms related to the query. As an example, consider that a user submits a search query, 'Best home theater system' via a search query interface provided by the electronic marketplace website. In one embodiment, the interactive network region generation module 1006 may be configured to identify the term 'Best' in the query as a comparison term and identify a list of comparable items related to the query. In one example, comparable items related to a query may be identified based on identifying the category of an item (e.g., entertainment systems) in the query submitted by the user. In some examples, comparable items related to a query may be identified based on analyzing search query histories submitted by users of the electronic marketplace. For example, search histories may be analyzed to identify possible variations and/or modifications (e.g., term additions, term deletions, re-formulations and the like) to search terms submitted by the users in relation to the search string issued by the user. Search histories may also be analyzed to determine a frequency of occurrence of such groups of terms, purchase histories indicative of particular items purchased and/or rented by users of the electronic marketplace, and the like.

In some examples, the list of comparable terms related to the query may also be identified based on fingerprint information related to the query. For example, the query fingerprint generation module (e.g., 318) may determine that fingerprint information related to the query 'Best home theater system' includes one or more re-formulations of the query to 'Top reviewed home theater systems,' 'Most reviewed for home theatre systems,' and the like. In one embodiment, the interactive network region generation module 1006 may then be configured to identify terms such as 'Top,' 'Most reviewed,' and the like as comparison terms and generate an interactive network region comprising a 'filmstrip' of information that identifies a list of comparable items such as '#1 Best Seller,' 'Top Reviewed,', 'Most Wished For,' and 'Special Offer,' based on the fingerprint information. The manner in which the interactive network region generation module 1006 may dynamically modify search results presented to a user based on comparison terms identified in the query fingerprint is discussed in detail relation to FIGS. 16-17.

Figure 16:
FIG. 16 is an exemplary illustration of modified search results presented to a user based on identifying comparison terms in a query.

FIG. 16 is an exemplary illustration of modified search results presented to a user based on identifying comparison terms in a query. In FIG. 16, the example environment 1600 may be a graphical user interface viewable via a browser application (e.g., via the browser application 206) on the user's device. In the example illustrated in FIG. 16, a user submits a search query 'best home theater system,' via a search query interface 1602 provided by the electronic marketplace website. The query fingerprint generation module (e.g., 318) may identify the term 'best' as a comparison term in the query. The interactive network region generation module 1006 may then be configured to identify a list of comparable items related to a query based on fingerprint information related to the query stored in the query classification database as discussed above. In one embodiment, the interactive network region generation module 1008 may generate an interactive network region comprising a 'filmstrip' of information 1604 that identifies a list of comparable items related to the query based on the fingerprint information. In some examples, a user may select a user interface element 'Expand' 1606 in the rendered network page to view additional details of one or more items in the list of comparable items related to the query.

In some embodiments, the interactive network region generation module 1008 may also be configured to generate a set of search results 1608 corresponding to the search query submitted by the user. The rendering engine 1010 may be configured to provide information for rendering a network page that includes the list of comparable items and the set of search results to the user. The search results 1608 may be rendered to the user in any one of the layouts (e.g., list layout, grid layout or an image layout) as discussed above.

FIG. 17 is an exemplary illustration of modified search results presented to a user based on identifying comparison terms in a query, in accordance with one embodiment of the present disclosure. In FIG. 17, the example environment 1700 may be a graphical user interface viewable via a browser application (e.g., via the browser application 206) on the user's device. In the example illustrated in FIG. 17, a user may view additional details 1706 of one or more items in the list of comparable items 1704 related to a query 'best home theater system,' 1702 when the user selects a user interface element (e.g., 'Expand' 1606 shown in FIG. 16) in the rendered network page.

In accordance with at least some embodiments, the interactive network region generation module 1006 may be configured to identify 'theme' information in a query issued by the user and dynamically modify search results presented to the user based at least in part on the theme information. In one example, 'theme' information may relate to a theme-based keyword phrase in the search query submitted by the user. As an example, consider that a user submits a search query, 'Star Wars' via a search query interface provided by the electronic marketplace website. In one embodiment, the interactive network region generation module 1006 may be configured to identify that the search term 'Star Wars' corresponds to a theme-based keyword phrase in the query. The query fingerprint generation module (e.g., 318) may determine that the fingerprint for the query, 'Star Wars,' includes one or more re-formulations of the query that describe various characteristics of the theme. In one embodiment, the interactive network region generation module 1006 may be configured to dynamically modify search results presented to the user to include a plurality of items that correspond to various characteristics of the 'theme' identified in the query fingerprint.

In some embodiments, the interactive network region generation module 1006 may be configured to arrange items comprising search results related to the query in at least one of a 'grid' layout, a 'list' layout or an 'image' layout based on the 'theme' information. In at least some embodiments, the interactive network region generation module 1008 may be configured to receive a selection of an item in the search results and generate an interactive network region comprising 'theme' information related to the selected item. In some embodiments, the rendering engine 1010 may be configured to provide information for rendering a network page comprising various characteristics of the 'theme' to the user. The manner in which the interactive network region generation module 1008 may dynamically modify search results presented to a user based on identifying 'theme' information in a query is discussed in detail relation to FIGS. 18-19.

Figure 18:
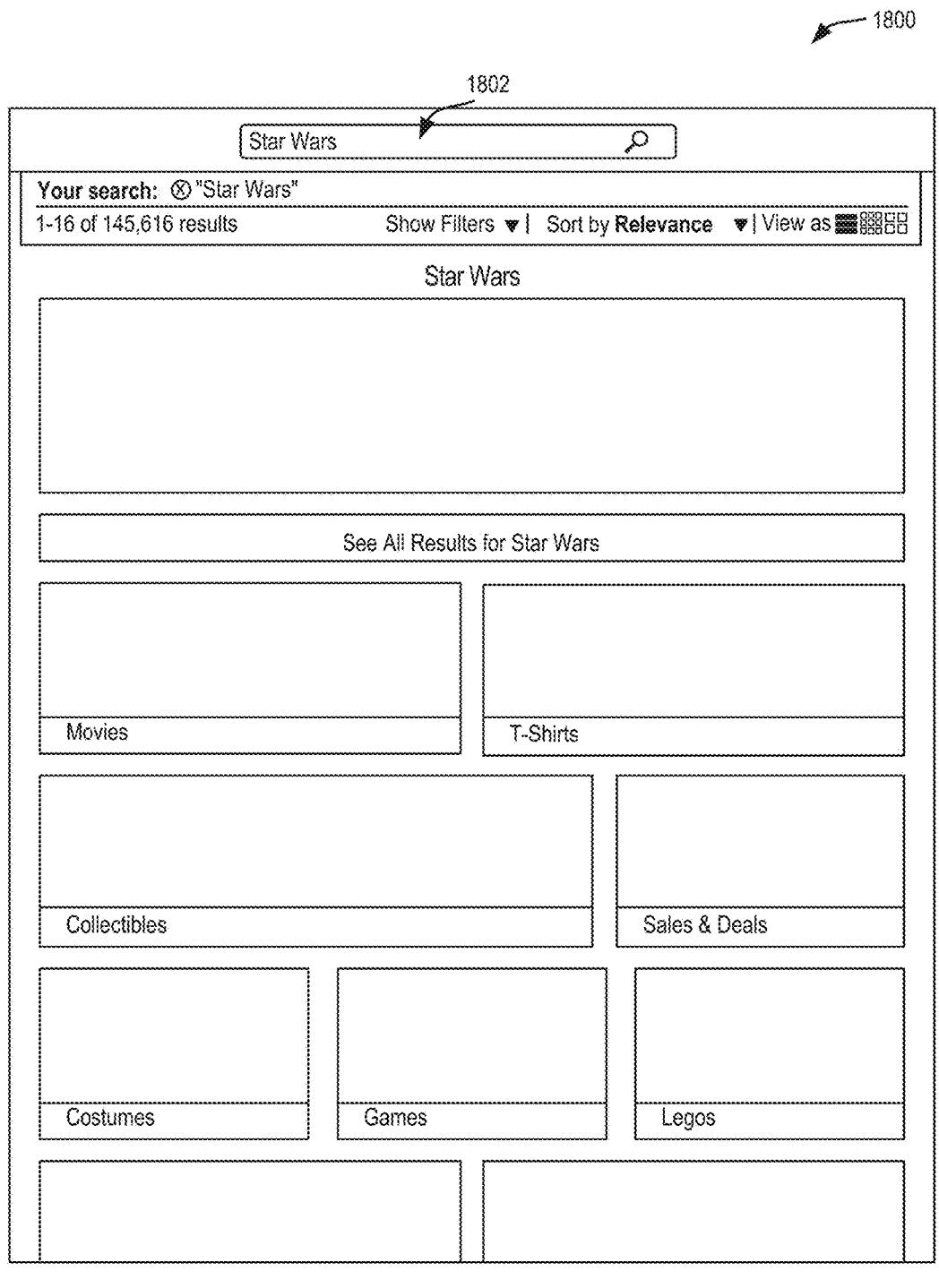
FIG. 18 is an exemplary illustration of modified search results presented to a user based on identifying theme information in a query.

FIG. 18 is an exemplary illustration of modified search results presented to a user based on identifying theme information in a query. In FIG. 18, the example environment 1800 may be a graphical user interface viewable via a browser application (e.g., via the browser application 206) on the user's device. In the example illustrated in FIG. 18, a user submits a search query 'Star Wars' via a search query interface 1802 provided by the electronic marketplace website. The query fingerprint generation module (e.g., 318) may identify that the search query corresponds to a theme-based keyword phrase (i.e., 'Star Wars'). The interactive network region generation module 1008 may then dynamically modify search results 1804 presented to the user by identifying items that correspond to various characteristics of the 'theme' based on the query fingerprint. In some embodiments, the interactive network region generation module 1006 may be configured to arrange the items of the search results in at least one of a grid layout, a list layout or an image layout in a network page rendered to the user based on the 'theme.' In the example illustrated in FIG. 18, items such as 'Movies #,' 'T-shirts #,' 'Collectibles #,', 'Sales& Deals #,' 'Costumes #,' 'Games #,' 'Legos #,' and the like may identify various characteristics of the 'theme' of the query, 'Star Wars' submitted by the user.

Figure 19:
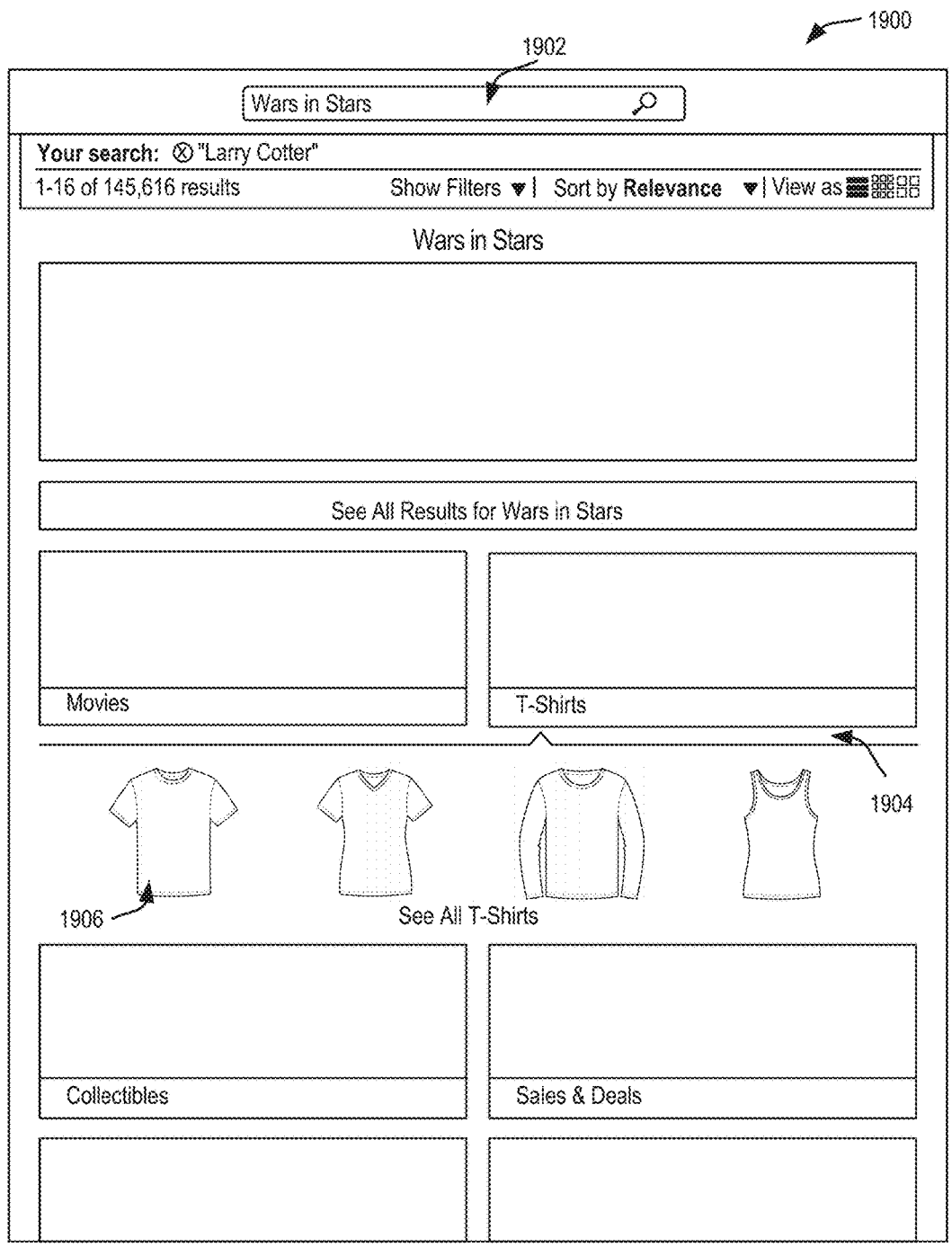
FIG. 19 is an exemplary illustration of modified search results presented to a user based on identifying theme information in a query, in accordance with one embodiment of the present disclosure.

FIG. 19 is an exemplary illustration of modified search results presented to a user based on identifying theme information in a query, in accordance with one embodiment of the present disclosure. In FIG. 19, the example environment 1900 may be a graphical user interface viewable via a browser application (e.g., via the browser application 206) on the user's device. In the example illustrated in FIG. 19, a user may select an item 1904 such as 'T-Shirts #,' from the plurality of items identifying characteristics of the 'theme' of the query issued by the user. A set of search results 1906 that describe additional details of the selected item 1904 that correspond to the 'theme' may be rendered in an interactive network region in the network page, to the user.

Figure 20:
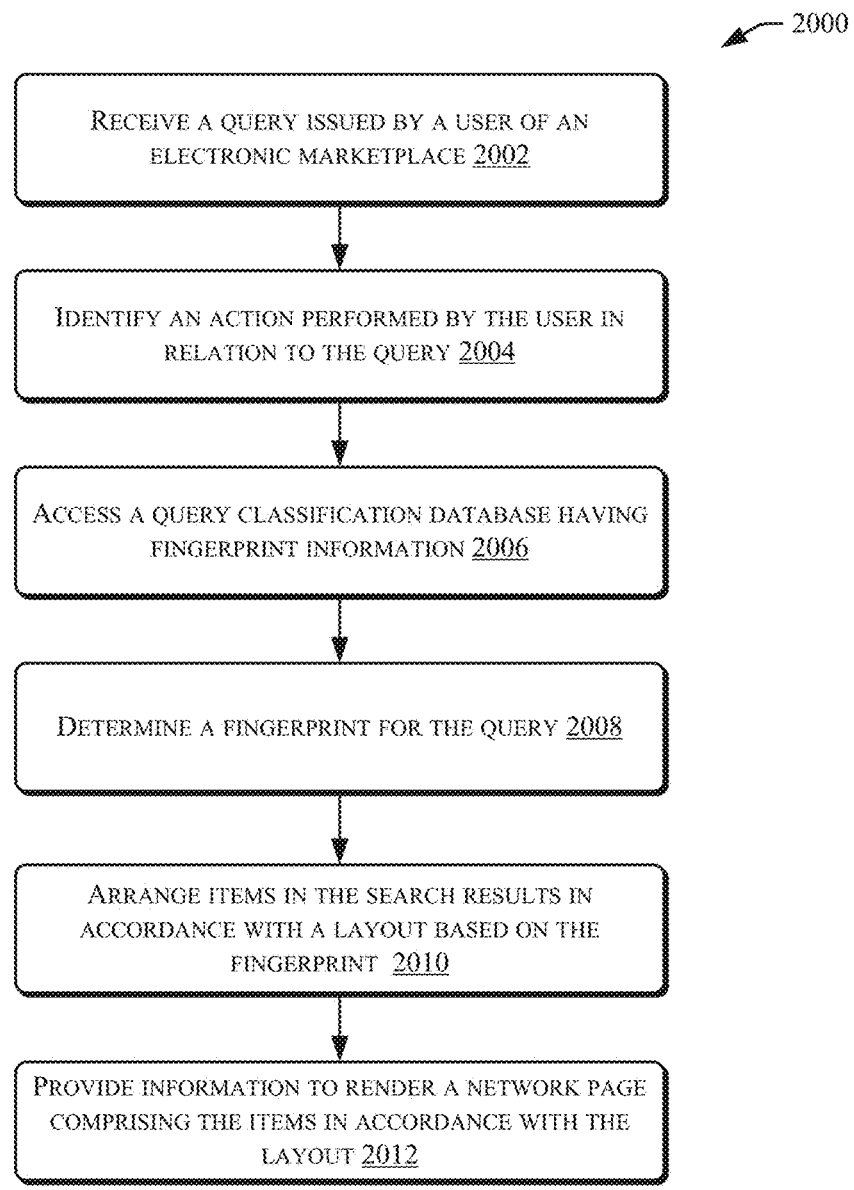
FIG. 20 illustrates a flow diagram of an example process 2000 for modifying search results based on fingerprint information related to a query, described herein.
Figure 21:
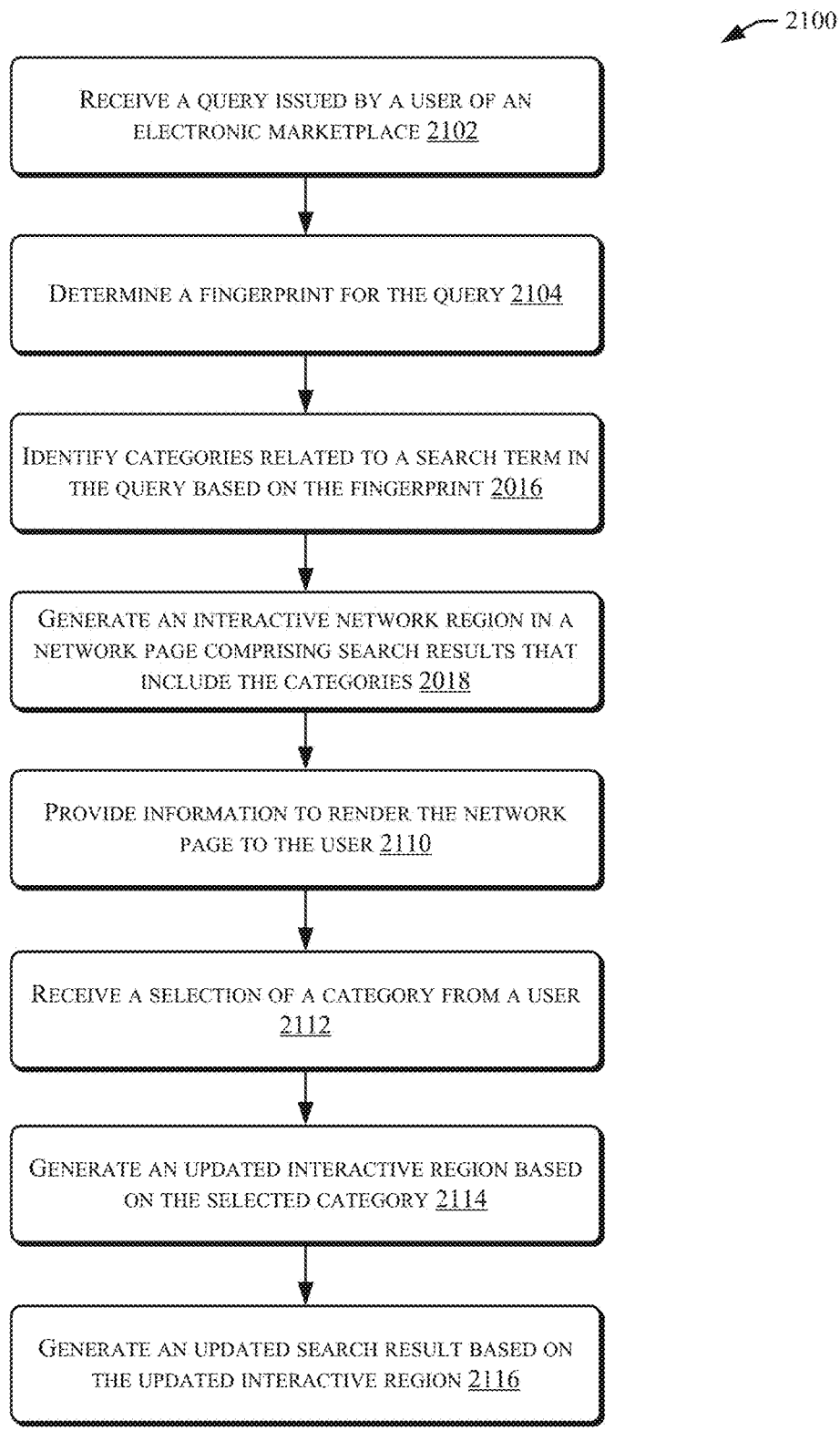
FIG. 21 illustrates a flow diagram of an example process 2100 for modifying search results based on fingerprint information related to a query, in accordance with another embodiment of the present disclosure.
Figure 22:
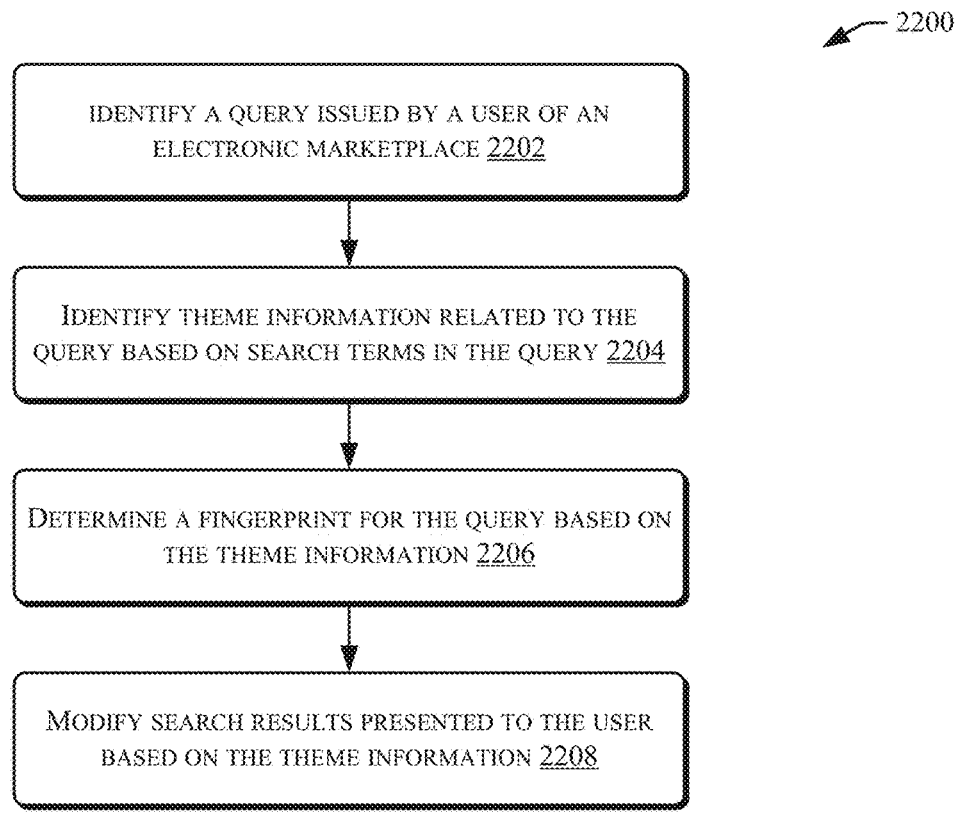
FIG. 22 illustrates a flow diagram of an example process 2200 for modifying search results based on fingerprint information related to a query, described herein.

FIGS. 20-22 illustrate example flow diagrams showing respective processes 2000, 2100 and 2200 for dynamically modifying search results presented to a user based on fingerprint information, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

In some examples, the query fingerprint generation and classification service 230 (e.g., utilizing at least the query fingerprint generation module 318, the query fingerprint classification module 320 and the dynamic network content generation module 322) shown in at least FIG. 3, FIG. 10 (and others) may perform the processes 2000, 2100 and 2200 of FIG. 20, FIG. 21 and FIG. 22 respectively.

FIG. 20 illustrates a flow diagram of an example process 2000 for modifying search results based on fingerprint information related to a query, described herein. The process at 2000 may begin at 2002 by receiving a query issued by a user of an electronic marketplace. At 2004, the process 2000 may include identifying an action performed by the user in relation to the query. As discussed above, an action may correspond to a 'first query' or an 'initial query' (e.g., 'phone case') submitted by the user. At 2006, the process 2000 may include accessing a query classification database having fingerprint information. At 2008, the process 2000 may include determining a fingerprint for the query by comparing the fingerprint information in the query classification database to the action performed by the user in relation to the query. As an example, the fingerprint for the query may indicate one or more subsequent actions performed by one or more users of the electronic marketplace in relation to the query, 'phone case.' As discussed in relation to FIG. 11, a subsequent action may correspond to a 'term addition' to the query that describes, for example, additional characteristics of the query such as the color of the phone case, the size of the phone case, a particular brand of the phone, and so on. At 2010, the process 2000 may include arranging a plurality of items comprising search results related to the query in accordance with a layout based at least in part on the fingerprint. As an example, the plurality of items comprising the search results may be arranged in at least one of a list layout, a grid layout or an image layout as discussed in relation to FIGS. 11-13. At 2012, the process 2000 may include providing information for rendering a network page comprising the plurality of items in accordance with the layout, to the user.

FIG. 21 illustrates a flow diagram of an example process 2100 for modifying search results based on fingerprint information related to a query, in accordance with another embodiment of the present disclosure. The process at 2100 may begin at 2102 by receiving a query issued by a user of the electronic marketplace. At 2104, the process 2100 may include determining a fingerprint for the query. The fingerprint for the query may be determined as discussed in relation to FIG. 10 based on fingerprint information stored in the query classification database. At 2106, the process 2100 may include identifying categories related to a search term in the query based on the query fingerprint. In one example, the various categories related to a search term in the query may be identified based on identifying search terms in the query fingerprint as discussed in FIG. 10. In some embodiments, at 2108, the process 2000 may include generating an interactive network region comprising a 'filmstrip' of categories related to the query based on the identified search terms in the query fingerprint. At 2110, the process 2000 may include providing information for rendering a network page comprising the 'filmstrip' of categories and the search results to the user.

In some embodiments, at 2112, the process 2000 may include receiving a selection of a category from the plurality of categories presented in the 'filmstrip' from the user. At 2114, the process 2000 may include generating an updated interactive network region in the network page rendered to the user based on the selected category. At 2116, the process 2000 may include generating an updated search result in response to the updated interactive network region.

FIG. 22 illustrates a flow diagram of an example process 2200 for modifying search results based on fingerprint information related to a query, described herein. The process at 2200 may begin at 2202 by identifying a query issued by a user of an electronic marketplace. At 2204, the process 2200 may include identifying theme information in the query based on search terms in the query. As discussed in relation to FIG. 10, theme information in a query may correspond to theme-based keyword phrase in the query. At 2206, the process 2200 may include determining a fingerprint for the query based on the theme information. At 2208, the process 2200 may include dynamically modifying search results presented to the user to include a plurality of items corresponding to various characteristics of the 'theme' identified in the query fingerprint.

Returning to the discussion of FIG. 10, in accordance with at least some embodiments, the dynamic network content generation module 322 may include a category identification module 1008. The category identification module 1008 may be configured to identify a plurality of categories related to a query issued by a user based on the query fingerprint and organize a plurality of items comprising search results related to the query based on the identified categories. The categories related to a query may be identified by identifying search terms in the query fingerprint. As an example, consider that a user submits a search query 'Running' via a search query interface provided by the electronic marketplace website. The query fingerprint generation module (e.g., 318) may determine a fingerprint for the query based on fingerprint information stored in the query classification database. The fingerprint for the query may indicate a set of actions performed by users of the electronic marketplace in relation to the query. These actions may include, for example, re-formulations, term additions, term deletions, term swaps, and the like to the query which may indicate that users who submitted a search query, 'Running,' searched for 'books on running', 'sport shoes', 'running accessories,' and the like. In one embodiment, the category identification module 1008 may be configured to identify various categories related to the query 'Running,' based on these search terms. As an example, the category identification module 1008 may identify various categories related to 'Running,' such as 'Sports & Outdoors,' 'Books,' 'Clothing & Accessories,' and the like based on search terms obtained on the query fingerprint.

In one example, the layout generation module 1004 may be configured to modify search results presented to the user by arranging items of the search result within each of the identified categories in a two-dimensional, scrollable 'grid' layout, based on the query fingerprint. In other examples, the layout generation module 1004 may modify search results presented to the user by arranging the items of the search result within each of the identified categories in a vertical 'list' of scrollable items, based on the query fingerprint. In some embodiments, the layout generation module 1004 may also modify search results presented to the user by arranging 'images' of the items of the search result within each of the identified categories, based on the query fingerprint.

In accordance with at least one embodiment, the category identification module 1008 may be configured to identify a plurality of sub-categories within each of the identified categories. The sub-categories may be identified in a manner similar to the identification of categories discussed above. The layout generation module 1004 may be configured to organize the plurality of sub-categories within each of the identified categories in accordance with one or more of the layouts described above. In some embodiments, the layout generation module 1004 may be configured to arrange the items of the search results within each of the identified categories into one or more customized layout templates. The customized layout templates may for example, overlay and/or align items of the search results in a fixed width layout, in a variable width layout, within a specified horizontal and vertical distance and so on. A customized layout template may also organize categories related to a query as variable sized boxes, in which the size of each box may be indicative of the number of items of the search result within each category.

In accordance with at least one embodiment, the category identification module 1008 may be configured to identify a plurality of filters related to each of the identified categories based on identifying search terms in the fingerprint information, receive a selection of a filter from a user and generate an updated set of categories and an updated set of search results for the user based on the selected filter. In some examples, the filters may identify a subset of items related to a subset of categories (e.g., the most popular categories) in the search results. The manner in which the category identification module 1008 may dynamically modify search results presented to a user by identifying categories related to a query based on the query fingerprint is discussed in detail relation to FIGS. 23-28.

Figure 23:
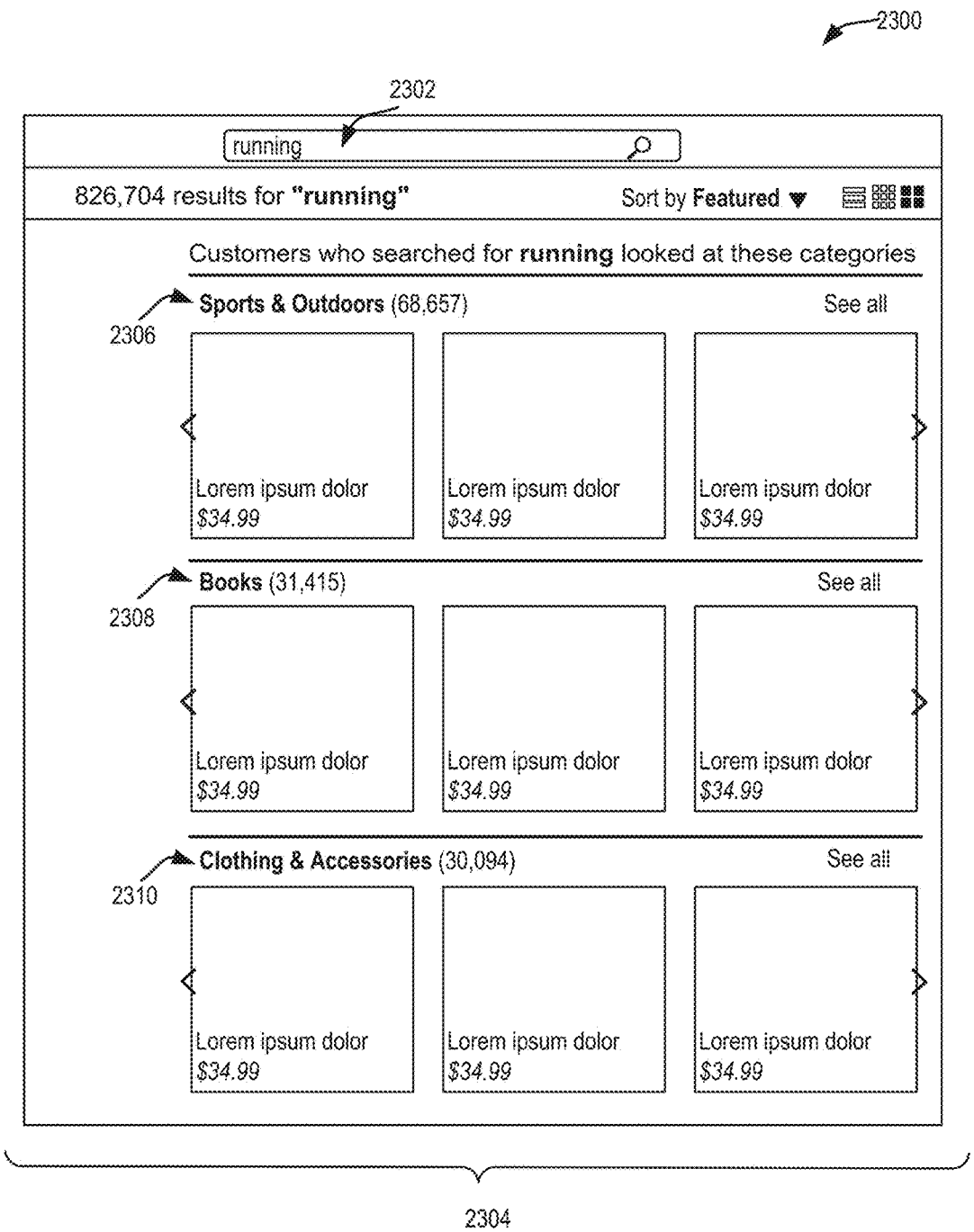
FIG. 23 is an exemplary illustration of modified search results presented to a user in which items of the search results are organized into a set of categories based on fingerprint information related to a query.

FIG. 23 is an exemplary illustration of modified search results presented to a user in which items of the search results are organized into a set of categories based on fingerprint information related to a query. In FIG. 23, the example environment 2300 may be a graphical user interface viewable via a browser application (e.g., via the browser application 206) on the user's device. In the example illustrated in FIG. 23, a user submits a search query 'running' via a search query interface 2302 provided by the electronic marketplace website. The query fingerprint generation module (e.g., 318) may determine a fingerprint for the query based on fingerprint information stored in the query classification database. The category identification module 1008 may then identify various categories related to the query based on identified search terms in the query fingerprint as discussed above. As an example, the category identification module 1008 may identify various categories related to the query, 'running' such as 'Sports & Outdoors 2306,' 'Books 2308,' 'Clothing & Accessories 2310,' and the like based on the query fingerprint and modify the search results presented to the user based on the identified categories. The layout generation module 1004 may arrange the items of the search result 2304 within each of the identified categories in accordance with a particular layout (e.g., a grid layout, a list layout or an image layout) as discussed in detail in relation to FIGS. 11-13.

Figure 24:
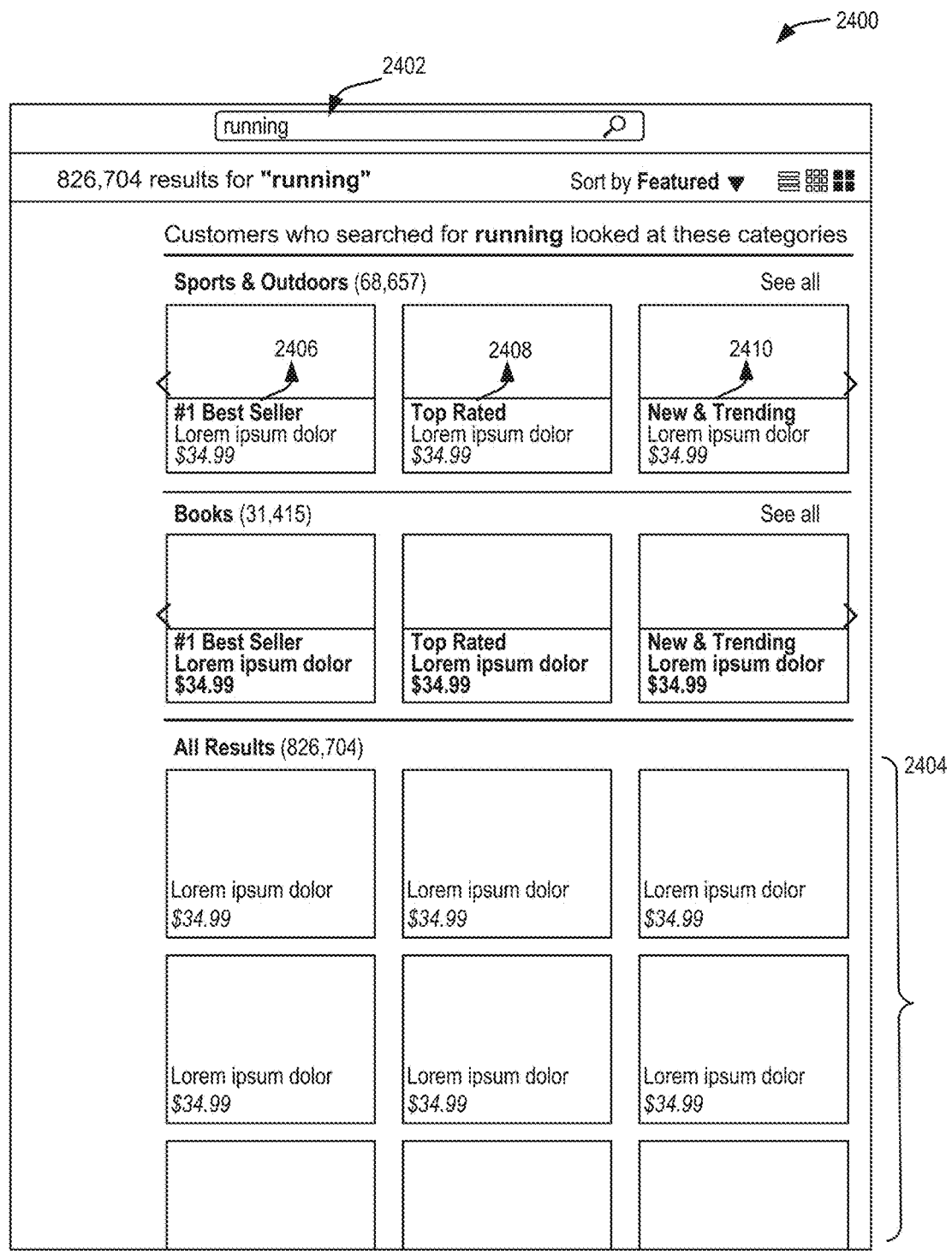
FIG. 24 is an exemplary illustration of modified search results presented to a user in which items of the search results are organized into various sub-categories within a set of categories based on fingerprint information related to a query.

FIG. 24 is an exemplary illustration of modified search results presented to a user in which items of the search results are organized into various sub-categories within a set of categories based on fingerprint information related to a query. In FIG. 24, the example environment 2400 may be a graphical user interface viewable via a browser application (e.g., via the browser application 206) on the user's device. In the example illustrated in FIG. 24, a user submits a search query 'running' via a search query interface 2402 provided by the electronic marketplace website. The query fingerprint generation module (e.g., 318) may determine a fingerprint for the query based on fingerprint information stored in the query classification database. The category identification module 1008 may then identify various sub-categories and/or a set of related items within each category related to the query based on identified search terms in the query fingerprint and modify search results presented to the user based on the query fingerprint. The layout generation module 1004 may organize the set of related items and/or the sub-categories within each of the identified categories in a particular layout (e.g., a grid layout, a list layout or an image layout). In the example illustrated in FIG. 24, the category identification module 1008 may identify a set of related items and/or various sub-categories such as '#1 Best Seller 2406,' 'Top Rated 2408,' 'New & Trending 2410,' and the like within each of the categories, 'Sports & Outdoors,' 'Books,' 'Clothing & Accessories,' based on the query fingerprint and modify search results presented to the user based on the identified sub-categories and categories. For example, the layout generation module 1004 may organize the sub-categories of the search result within each of the identified categories in a 'grid' layout. In some embodiments, the layout generation module 1004 may also be configured to present a set of search results 2404 to the user based on the query fingerprint. The items of the search results may further be arranged in at least one of a grid layout, a list layout or an image layout as discussed above.

Figure 25:
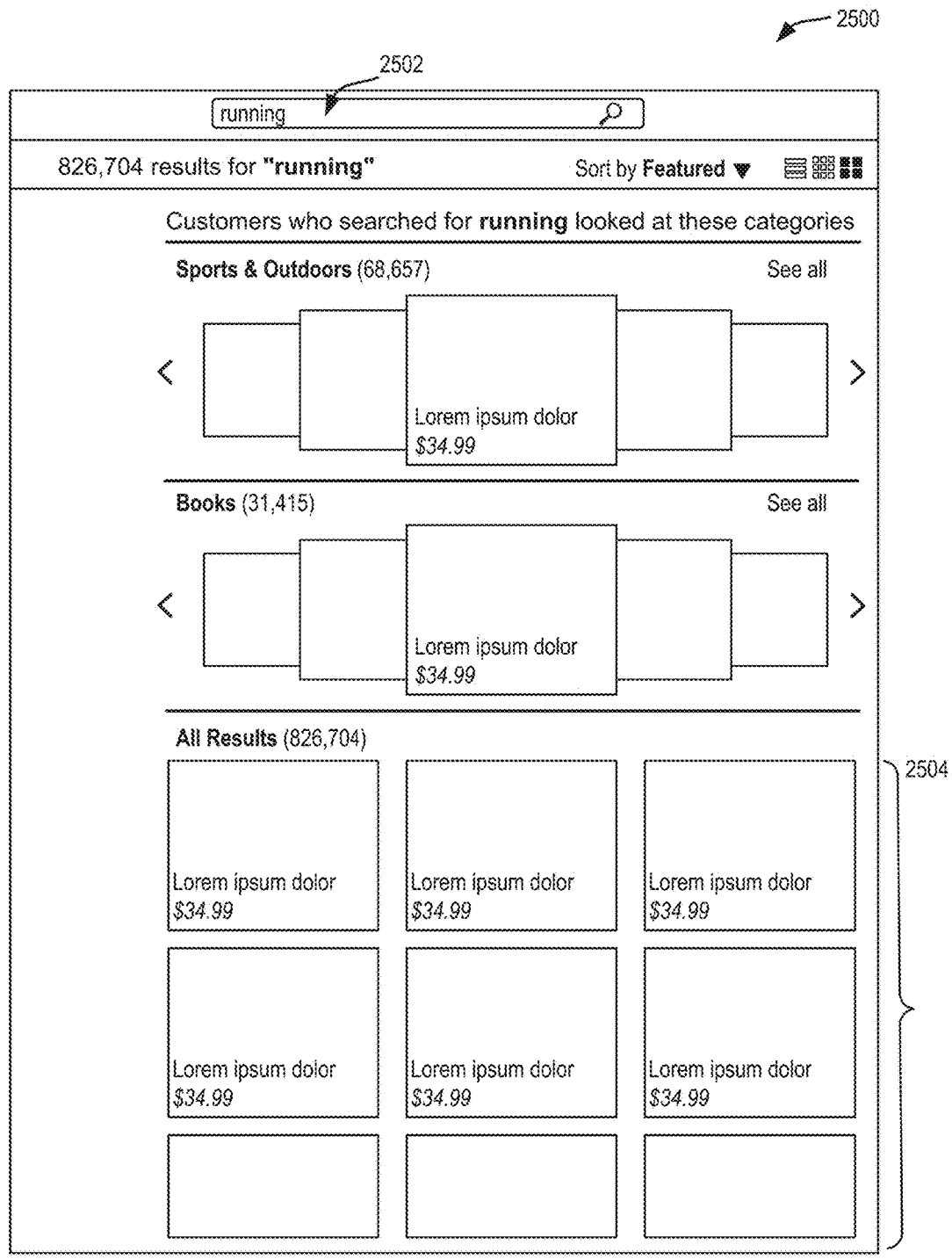
FIG. 25 is an exemplary illustration of modified search results presented to a user in which items of the search results are overlayed on top of each other and aligned in a fixed width layout, based on fingerprint information related to a query.

FIG. 25 is an exemplary illustration of modified search results presented to a user in which items of the search results are overlayed on top of each other and aligned in a fixed width layout, based on fingerprint information related to a query. In FIG. 25, the example environment 2500 may be a graphical user interface viewable via a browser application (e.g., via the browser application 206) on the user's device. In the example illustrated in FIG. 25, a user submits a search query 'running' via a search query interface 2502 by the electronic marketplace website. The query fingerprint generation module (e.g., 318) may determine a fingerprint for the query based on fingerprint information stored in the query classification database as discussed in relation to FIG. 10. The category identification module 1008 may then identify various categories (e.g., 'Sports &Outdoors,' 'Books,' and the like) related to the query based on identified search terms in the query fingerprint and modify search results presented to the user based on the identified categories. In one embodiment, the layout generation module 1004 may organize the items of the search result within each of the identified categories by overlaying the items in a fixed width layout within each of the identified categories. The items of the search result 2504 may further be arranged in a grid layout as illustrated in FIG. 25.

Figure 26:
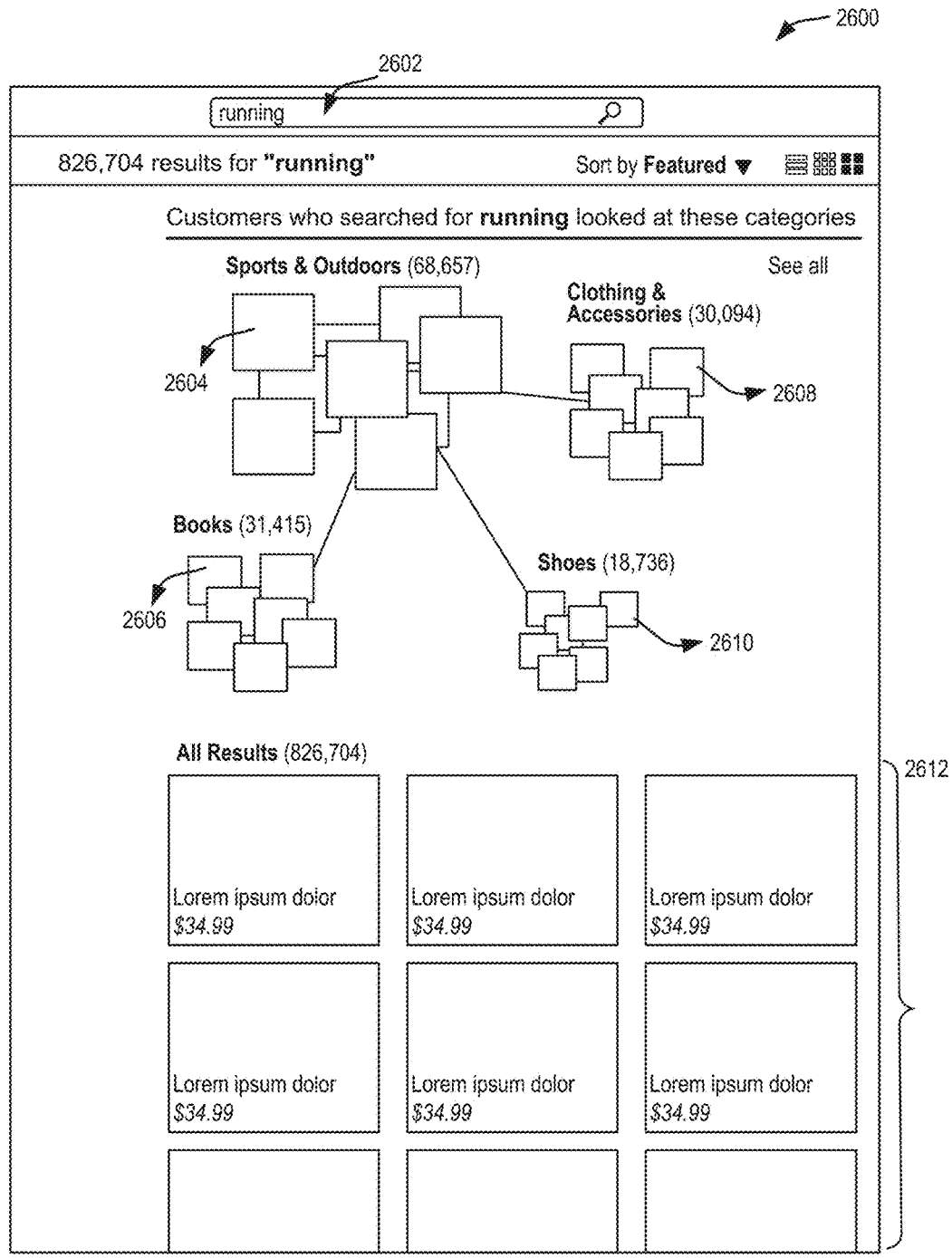
FIG. 26 is an exemplary illustration of modified search results presented to a user in which categories related to a query are organized in a ranked order based on fingerprint information related to a query.

FIG. 26 is an exemplary illustration of modified search results presented to a user in which categories related to a query are organized in a ranked order based on fingerprint information related to a query. In FIG. 26, the example environment 2600 may be a graphical user interface viewable via a browser application (e.g., via the browser application 206) on the user's device. In the example illustrated in FIG. 26, a user submits a search query 'running' via a search query interface 2602 provided by the electronic marketplace website. The query fingerprint generation module (e.g., 318) may determine a fingerprint for the query based on fingerprint information stored in the query classification database as discussed in relation to FIG. 10. The category identification module 1008 may then identify various categories related to the query based on identified search terms in the query fingerprint and modify search results presented to the user by arranging the items of the search result within each of the identified categories. In one embodiment, the identified categories related to a query may be organized in a ranked order by representing the items within each category in different sized boxes wherein the size of a box within a category may correspond to the number of items of the search result within the category. In the example illustrated in FIG. 23, the layout generation module 1008 may identify various categories related to the query, 'running' such as 'Sports & Outdoors,' 'Books,' 'Clothing & Accessories,' and the like based on the query fingerprint and modify search results presented to the user by organizing the categories related to the query in a ranked order by representing the items within each category in different sized boxes 2604, 2606, 2608 and 2610 based on the number of items of the search result present in each of the identified categories. The items of the search result 2612 may further be arranged in a 'grid' layout as illustrated in FIG. 26.

Figure 27:
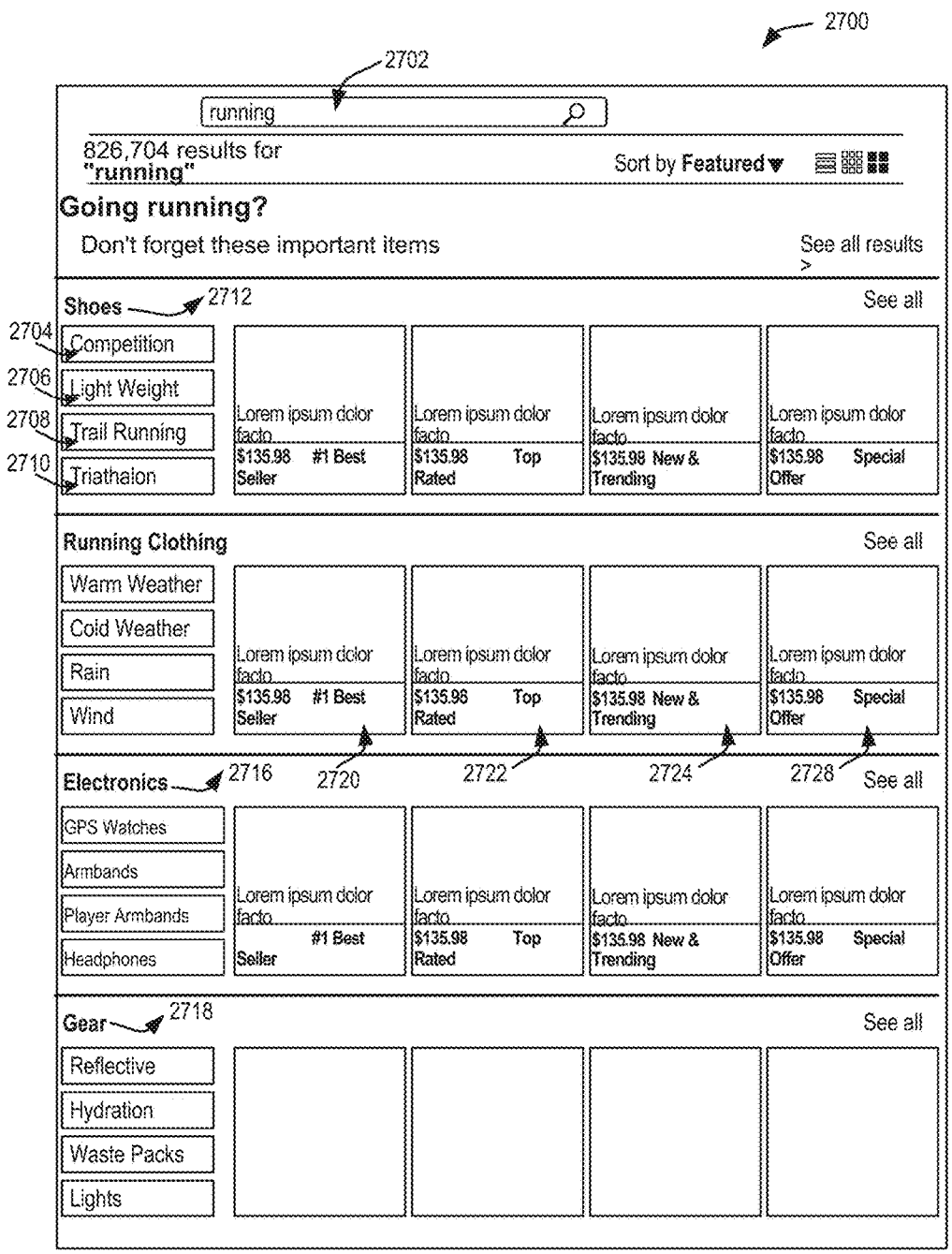
FIG. 27 is an exemplary illustration of modified search results presented to a user in which a plurality of filters related to a plurality of categories of a query are presented to a user, based on fingerprint information related to a query.

FIG. 27 is an exemplary illustration of modified search results presented to a user in which a plurality of filters related to a plurality of categories of a query are presented to a user, based on fingerprint information related to a query. In FIG. 27, the example environment 2700 may be a graphical user interface viewable via a browser application (e.g., via the browser application 206) on the user's device. In the example illustrated in FIG. 27, a user submits a search query 'running' via a search query interface 2702 provided by the electronic marketplace website. The query fingerprint generation module (e.g., 318) may determine a fingerprint for the query based on fingerprint information stored in the query classification database as discussed in relation to FIG. 10. The category identification module 1008 may then identify various filters for various categories related to the query based on identified search terms in the query fingerprint and modify search results presented to the user based on the identified filters. The layout generation module 1004 may organize sub-categories and/or filters identified for each category into one or more layouts such as a grid layout, a list layout or an image layout. In the example illustrated in FIG. 23, the category identification module 1008 may identify various categories related to the query, 'running' such as 'Shoes 2712,' 'Running Clothing 2714,' 'Electronics 2716,' 'Gear 2718,' and the like and identify filters within each of the identified categories. For example, filters related to the category, 'Shoes 2712,' may include, 'Competition 2704,' 'Light Weight 2706,' 'Trail Running 2708,' and 'Triathlon 2710.' In the example illustrated in FIG. 27, the filters in each of the identified categories may be organized in a 'list' layout and the sub-categories, '#1 Best Seller 2720,' 'Top Rated 2722,' 'New & Trending 2724,' and 'Special Offer 2728,' of the identified categories may be organized in a 'grid' layout.

Figure 28:
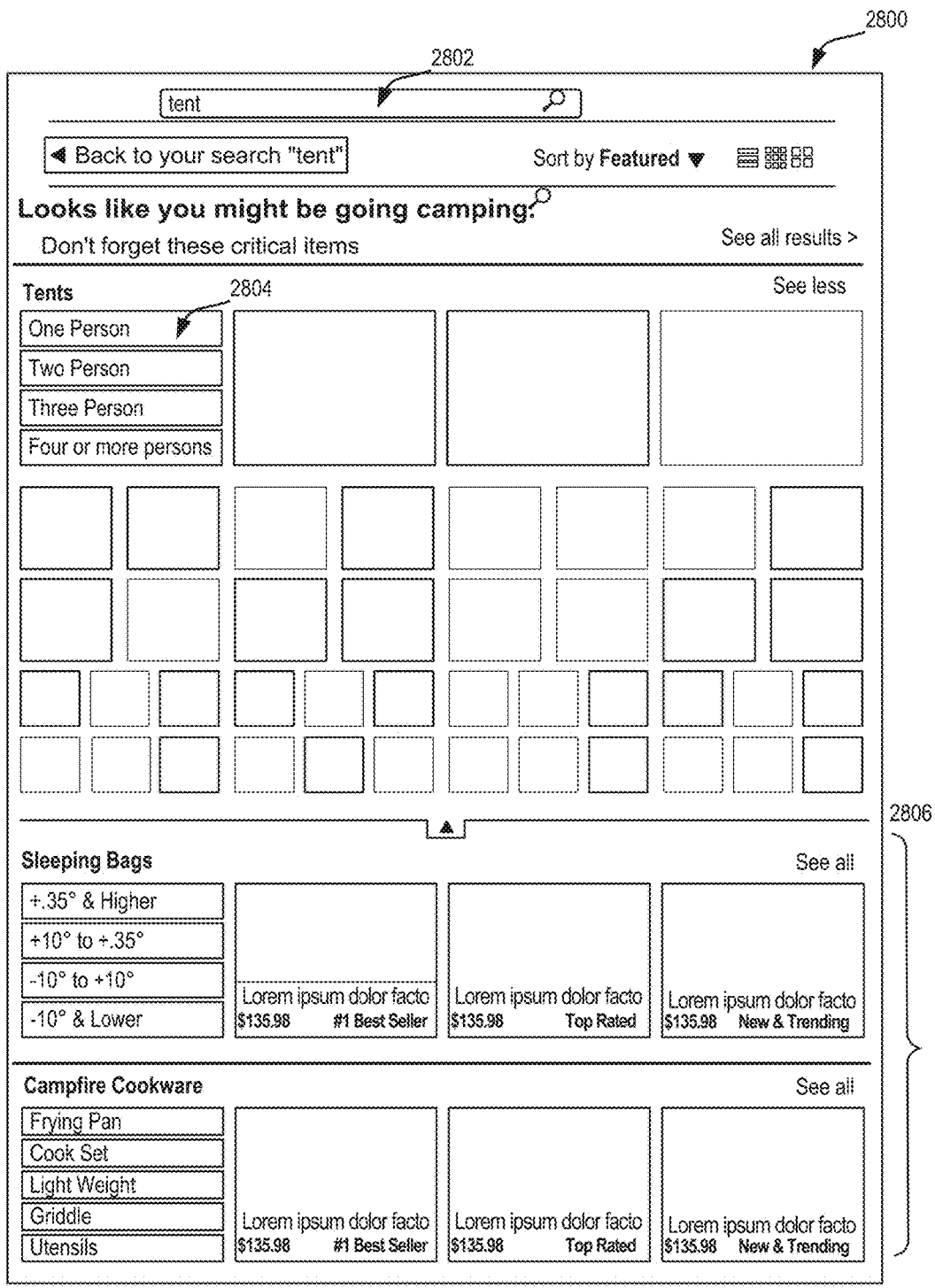
FIG. 28 is an exemplary illustration of modified search results presented to a user in which the user may navigate between various filers related to a category of a query.

FIG. 28 is an exemplary illustration of modified search results presented to a user in which the user may navigate between various filers related to a category of a query. In FIG. 28, the example environment 2800 may be a graphical user interface viewable via a browser application (e.g., via the browser application 206) on the user's device. In the illustrated example, a user may select a filter, 'One Person,' 2804 within a 'Tent' category based on a query 2802, 'Tent,' issued by the user. In one embodiment, the category identification module 1008 may generate an updated set of categories and sub-categories in the search results presented to the user, based on the selected filter. In some embodiments, the category identification module 1008 may also generate an updated set of search results 2806 corresponding to the selected filter.

Figure 29:
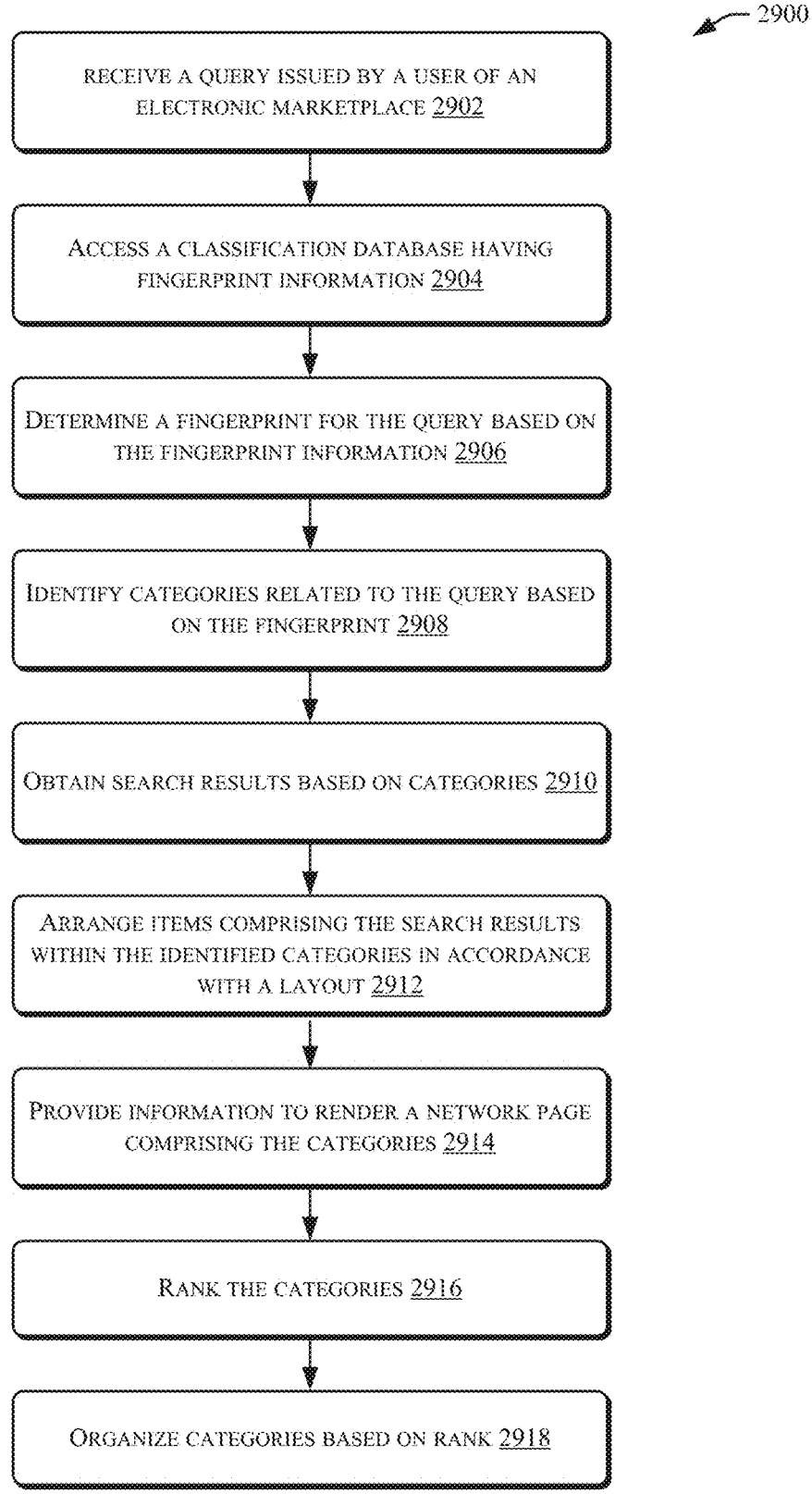
FIG. 29 illustrates a flow diagram of an example process 2900 for modifying search results presented to a user by identifying categories related to a query based on fingerprint information related to a query, described herein.
Figure 30:
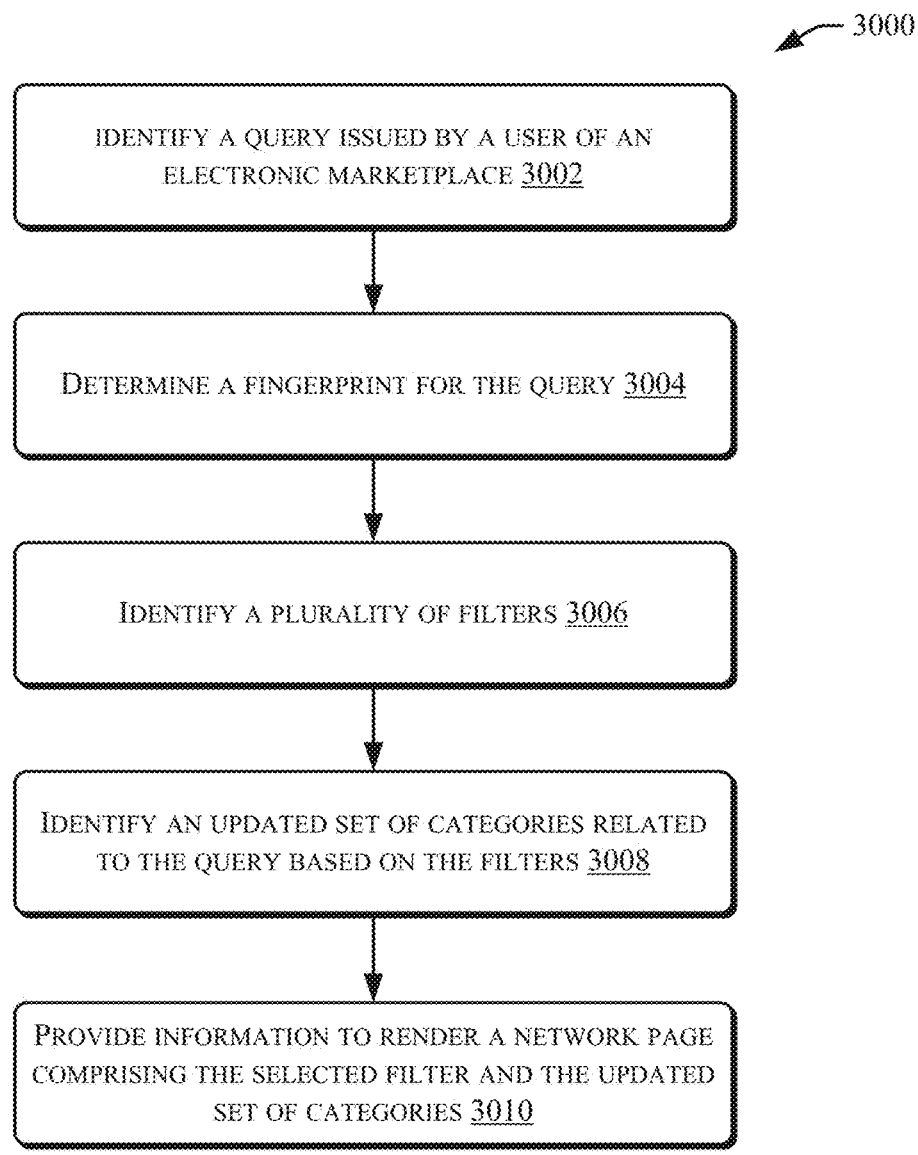
FIG. 30 illustrates a flow diagram of an example process 3000 for modifying search results presented to a user by identifying categories related to a query based on fingerprint information related to a query, described herein.

FIGS. 29-30 illustrate example flow diagrams showing respective processes 2900 and 3000 for dynamically modifying search results presented to a user by identifying categories related to a query based on fingerprint information, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

In some examples, the query fingerprint generation and classification service 230 (e.g., utilizing at least the query fingerprint generation module 318, the query fingerprint classification module 320 and the dynamic network content generation module 322) shown in at least FIG. 3, FIG. 10 (and others) may perform the processes 2900 and 3000 of FIG. 29 and FIG. 30 respectively.

FIG. 29 illustrates a flow diagram of an example process 2900 for modifying search results presented to a user by identifying categories related to a query based on fingerprint information related to a query, described herein. The process at 2900 may begin at 2902 by receiving a query issued by a user of an electronic marketplace. At 2904, the process 2900 may include accessing a query classification database having fingerprint information. At 2906, the process 2900 may include determining a fingerprint for the query based at least in part on the fingerprint information. At 2908, the process 2900 may include identifying a plurality of categories related to the query based on the fingerprint. The manner in which categories related to a query may be identified based on the query fingerprint is discussed in detail in relation to FIG. 10. At 2910, the process 2900 may include obtaining search results related to the query based at least in part on the plurality of categories. At 2912, the process 2900 may include arranging a plurality of items comprising the search results within each category of the plurality of categories in accordance with a layout. At 2914, the process 2900 may include providing information for rendering a network page comprising the plurality of categories and the plurality of items within each category of the plurality of categories in accordance with the layout, to the user. In some embodiments, at 2916, the process 2900 may include ranking each category of the plurality of categories in accordance with the number of search results obtained for each category. At 2918, the process 2900 may include organizing each category of the plurality of categories in accordance with the ranking in the network page rendered to the user.

FIG. 30 illustrates a flow diagram of an example process 3000 for modifying search results presented to a user by identifying categories related to a query based on fingerprint information related to a query, described herein. The process at 3000 may begin at 3002 by identifying a query issued by a user of an electronic marketplace. At 3004, the process 3000 may include determining a fingerprint for the query. At 3006, the process 3000 may include identifying a plurality of filters related to a plurality of categories of the query based on the fingerprint. The manner in which filters related to a category of a query may be identified based on the query fingerprint is discussed in detail in relation to FIG. 10. At 3008, the process 3000 may include identifying an updated set of categories related to the query based on the selected filter. At 3010, the process 3000 may include providing information for rendering a network page comprising the selected filter and the updated set of categories corresponding to the selected filter, to the user.

In accordance with at least some embodiments, the interactive network region generation module 1006 may be configured to generate an interactive network region comprising a plurality of categories related to the query in a network page. The layout generation module 1004 may be configured to arrange a plurality of items comprising search results related to the query in accordance with a layout within each category of the plurality of categories in the interactive network region. The rendering engine 1010 may be configured to providing information for rendering the network page comprising the interactive network region, the plurality of categories identified in the interactive network region and the plurality of items within the plurality of categories arranged in accordance with the layout, to the user.

Figure 31:
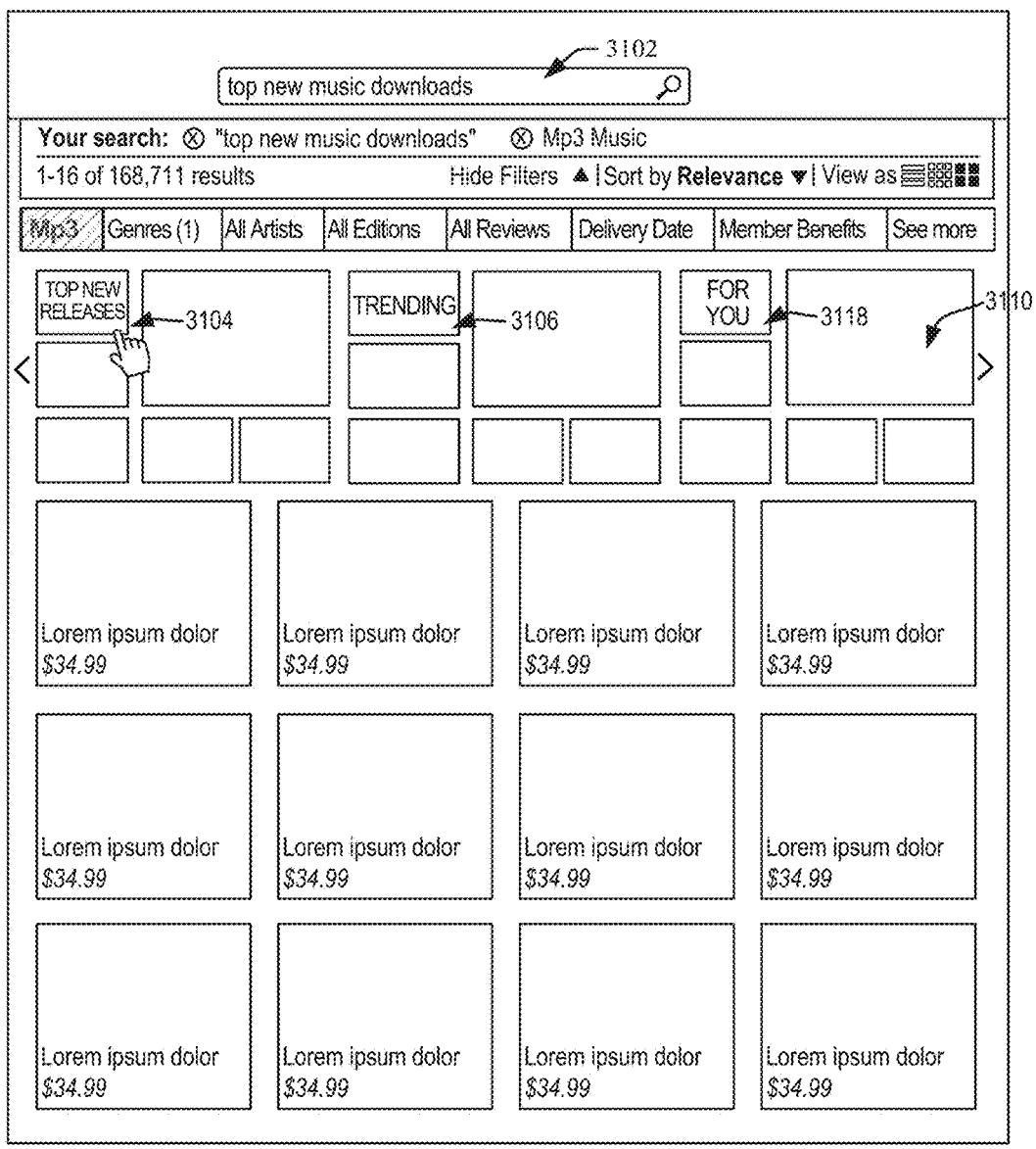
FIG. 31 is an exemplary illustration of modified search results presented to a user in which items of the search results are organized into a set of categories in an interactive network region in a network page based on fingerprint information related to a query.

FIG. 31 is an exemplary illustration of modified search results presented to a user in which items of the search results are organized into a set of categories in an interactive network region in a network page based on fingerprint information related to a query. In FIG. 31, the example environment 3100 may be a graphical user interface viewable via a browser application (e.g., via the browser application 206) on the user's device. In the example illustrated in FIG. 23, a user submits a search query 'top new music downloads' via a search query interface 3102 provided by the electronic marketplace website. The query fingerprint generation module (e.g., 318) may determine a fingerprint for the query based on fingerprint information stored in the query classification database. The category identification module 1008 may then identify various categories related to the query based on identified search terms in the query fingerprint as discussed above. As an example, the category identification module 1008 may identify various categories related to the query, 'top new music downloads' such as 'Top New Releases 3104,' 'Trending 3106,' 'For you 3108,' and the like based on the query fingerprint and modify the search results presented to the user based on the identified categories. The layout generation module 1004 may arrange the items of the search result within each of the identified categories in an interactive network region 3110 in accordance with a particular layout (e.g., a grid layout, a list layout or an image layout).

Figure 32:
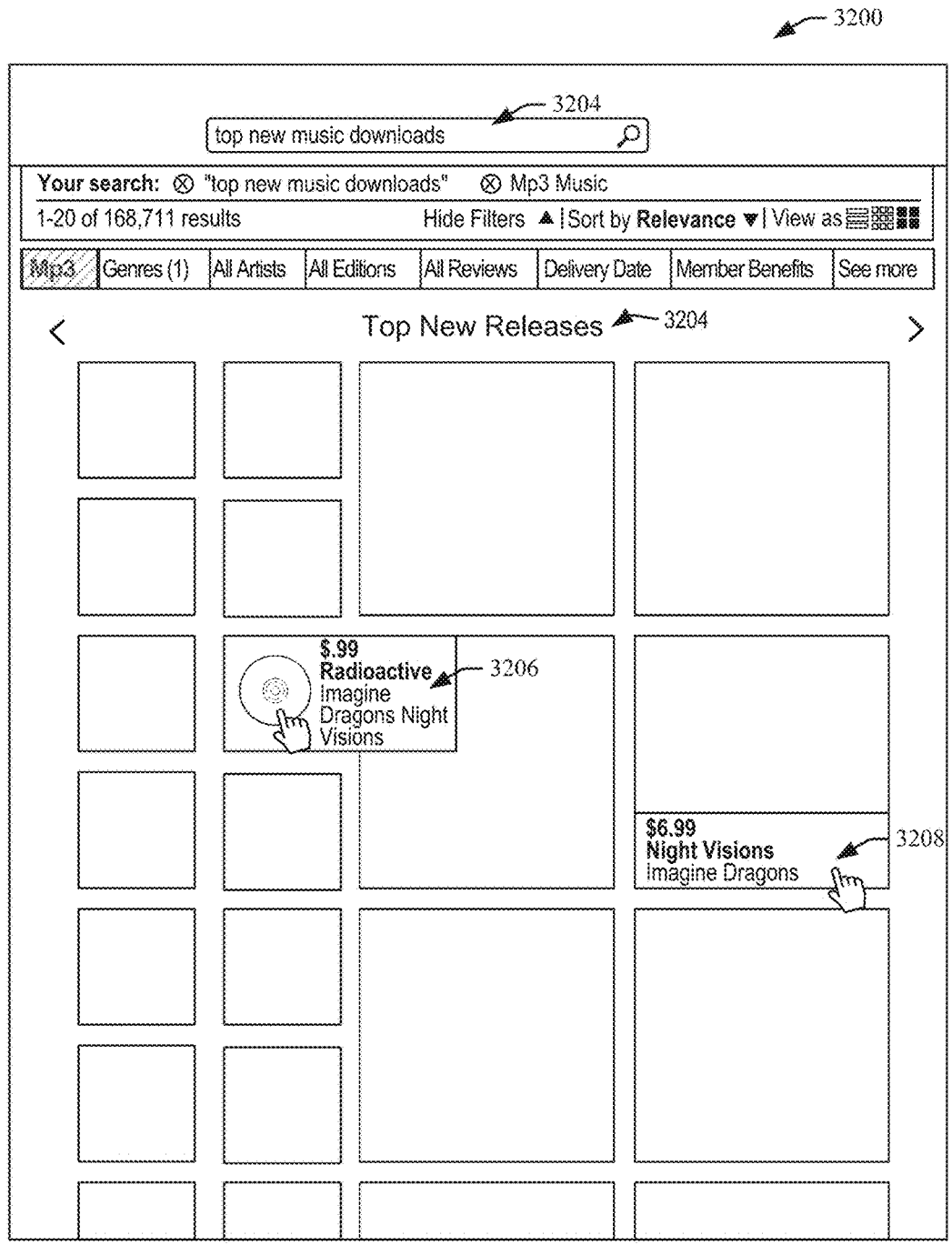
FIG. 32 is an exemplary illustration of modified search results presented to a user in which the user may navigate between various categories presented in an interactive network region.

FIG. 32 is an exemplary illustration of modified search results presented to a user in which the user may navigate between various categories presented in an interactive network region. In FIG. 32, the example environment 3200 may be a graphical user interface viewable via a browser application (e.g., via the browser application 206) on the user's device. In the illustrated example, a user may select a category, 'Top New Releases 3204,' from the categories displayed in the interactive network region. In one embodiment, and as discussed above, the interactive network region generation module 1008 may generate an updated interactive region specifying additional details 3206, 3208 related to the selected category. The rendering engine 1010 may be configured to providing information for rendering the updated interactive network region to the user.

Figure 33:
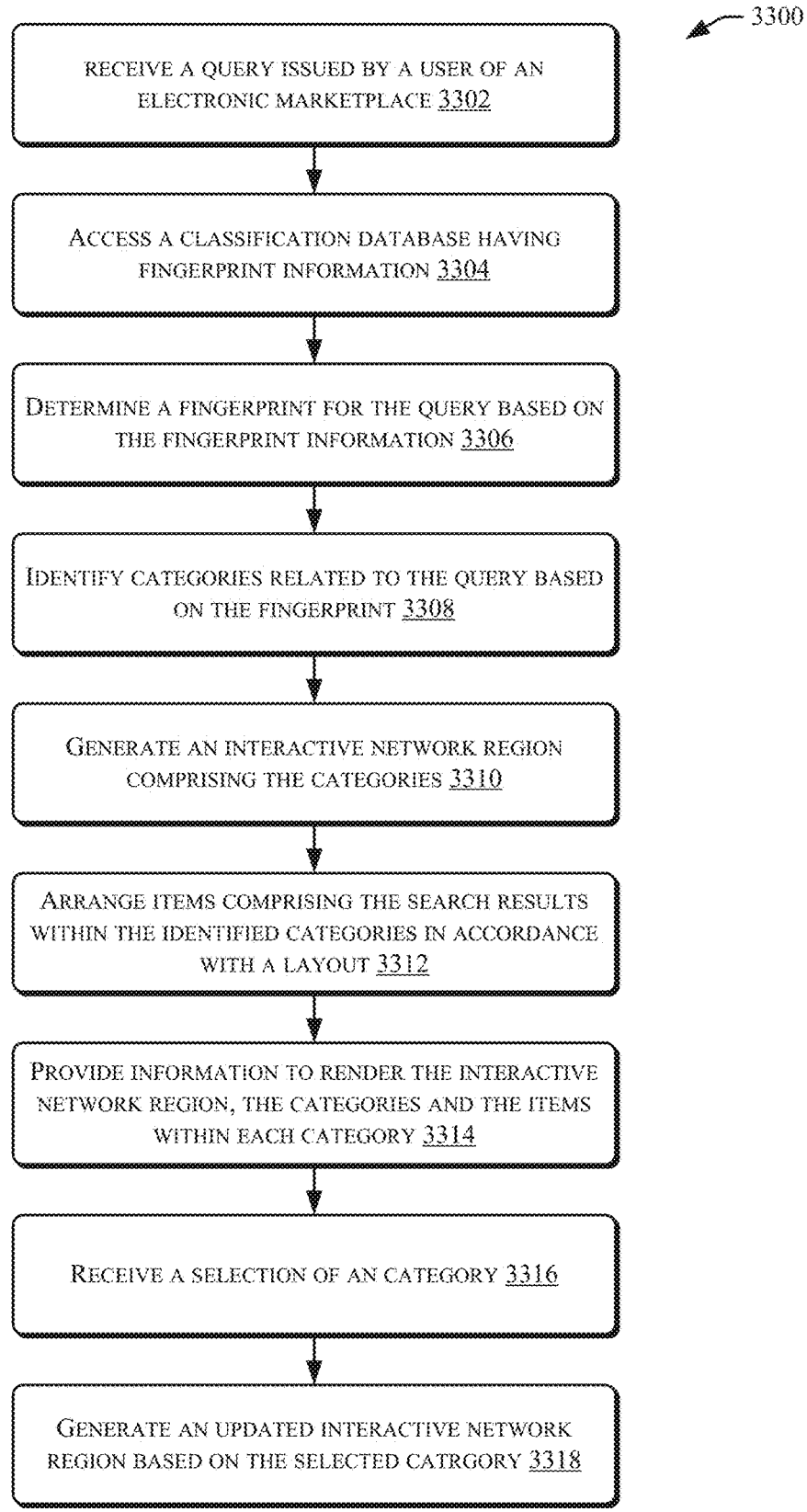
FIG. 33 illustrates a flow diagram of an example process 3300 for modifying search results presented to a user based on fingerprint information related to a query, described herein.

FIG. 33 illustrates a flow diagram of an example process 3300 for modifying search results presented to a user based on fingerprint information related to a query, described herein. The process at 3300 may begin at 3302 by receiving a query issued by a user of an electronic marketplace. At 3304, the process 3300 may include accessing a query classification database having fingerprint information. At 3306, the process 3300 may include determining a fingerprint for the query based at least in part on the fingerprint information. At 3308, the process 3300 may include identifying a plurality of categories related to the query based on the fingerprint. The manner in which categories related to a query may be identified based on the query fingerprint is discussed in detail in relation to FIG. 10. At 3310, the process 3300 may include generating an interactive network region comprising the plurality of categories in a network page. At 3312, the process 3300 may include arranging a plurality of items comprising search results related to the query in accordance with a layout within each category of the plurality of categories in the interactive network region. At 3314, the process 3300 may include providing information for rendering the network page comprising the interactive network region, the plurality of categories identified in the interactive network region and the plurality of items within the plurality of categories arranged in accordance with the layout, to the user. In some embodiments, at 3316, the process 3300 may include receiving a selection of a category from the plurality of categories from the user. At 3318, the process 3300 may include generating an updated interactive network region based at least in part on the selected category and rendering the updated interactive network region to the user.

Figure 34:
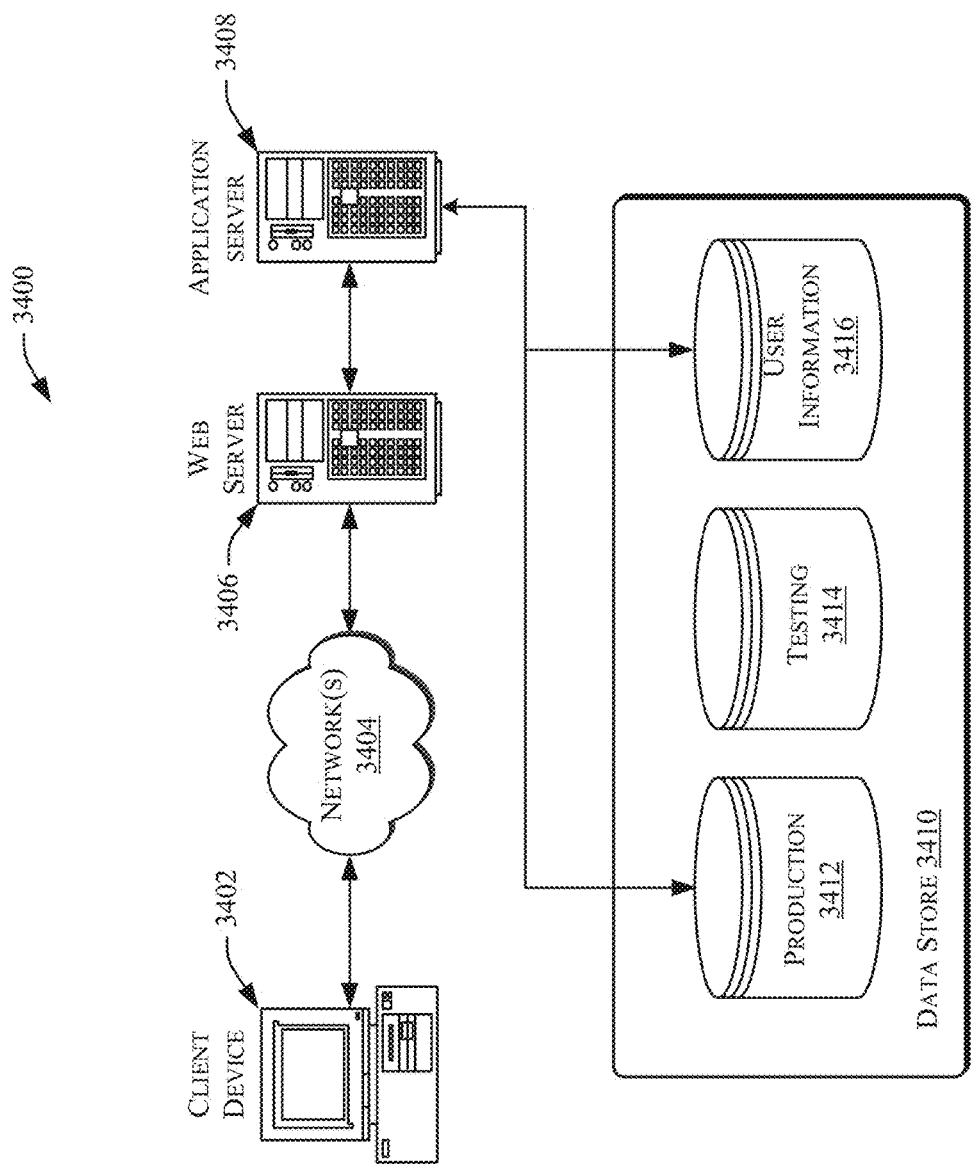
FIG. 34 illustrates an environment in which various embodiments can be implemented.

FIG. 34 illustrates aspects of an example environment 3400 for implementing aspects in accordance with various embodiments. As will be appreciated, although a Web-based environment is used for purposes of explanation, different environments may be used, as appropriate, to implement various embodiments. The environment includes an electronic client device 3402, which can include any appropriate device operable to send and receive requests, messages or information over an appropriate network 3404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 3406 for receiving requests and serving content in response thereto, although for other networks an alternative device serving a similar purpose could be used as would be apparent to one of ordinary skill in the art.

The illustrative environment includes at least one application server 3408 and a data store 3410. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 3402 and the application server 3408, can be handled by the Web server. It should be understood that the Web and application servers are not required and are merely example components, as structured code discussed herein can be executed on any appropriate device or host machine as discussed elsewhere herein.

The data store 3410 can include several separate data tables, databases or other data storage mechanisms and media for storing data relating to a particular aspect. For example, the data store illustrated includes mechanisms for storing production data 3412 and user information 3416, which can be used to serve content for the production side. The data store also is shown to include a mechanism for storing log data 3414, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 3410. The data store 3410 is operable, through logic associated therewith, to receive instructions from the application server 3408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 3402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 34. Thus, the depiction of the system 3400 in FIG. 34 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving an indication of a query executed by a user of an electronic marketplace;
    identifying an action performed by the user in relation to the query;
    accessing a query classification database having fingerprint information for a plurality of fingerprints, each fingerprint comprising a vector of features;
    determining a fingerprint of the plurality of fingerprints to be associated with the query based at least in part on the fingerprint information, the fingerprint determined by comparing a vector representing the action to the fingerprints of the plurality of fingerprints;
    identifying a plurality of categories related to the query based on the fingerprint;
    generating an interactive network region comprising the plurality of categories in a network page;
    arranging a plurality of items comprising search results related to the query in accordance with a layout within each category of the plurality of categories in the interactive network region; and
    providing information for rendering the network page comprising the interactive network region, the plurality of categories identified in the interactive network region and the plurality of items within the plurality of categories arranged in accordance with the layout.

2. The computer-implemented method of claim 1, further comprising arranging the plurality of items within each category of the plurality of categories in the interactive network region in a grid layout in the network page.

3. The computer-implemented method of claim 1, further comprising arranging the plurality of items within each category of the plurality of categories in the interactive network region a list layout in the network page.

4. The computer-implemented method of claim 1, further comprising arranging the plurality of items within each category of the plurality of categories in the interactive network region an image layout in the network page.

5. The computer-implemented method of claim 1, further comprising receiving a selection of an item of the plurality of items in the interactive network region from the user.

6. The computer-implemented method of claim 5, further comprising rendering the network page comprising an updated interactive network region based on the selected item.

7. A computer-implemented method, comprising:
    receiving an indication of a query executed by a user of an electronic marketplace;
    identifying an action performed by the user in relation to the query;
    accessing a query classification database having fingerprint information having a plurality of fingerprints, each fingerprint comprising a vector of features;

determining a fingerprint of the plurality of fingerprints to be associated with the query based at least in part on the fingerprint information, the fingerprint determined by comparing a vector representing the action to the fingerprints of the plurality of fingerprints;

identifying a plurality of categories related to the query based on the fingerprint;

generating an interactive network region in a network page comprising search results related to the query, the interactive network region identifying the plurality of categories; and providing information for rendering a network page comprising the interactive network region identifying the plurality of categories, to the user.

8. The computer-implemented method of claim 7, further comprising arranging a plurality of items comprising the search results in accordance with a layout within each category of the plurality of categories in the interactive network region.

9. The computer-implemented method of claim 7, further comprising providing information for rendering the network page comprising the interactive network region, the plurality of categories identified in the interactive network region and the plurality of items within each of the plurality of categories arranged in accordance with the layout, to the user.

10. The computer-implemented method of claim 8, further comprising arranging the plurality of items comprising the search results in accordance with a grid layout in the network page.

11. The computer-implemented method of claim 8, further comprising arranging the plurality of items comprising the search results in accordance with a list layout in the network page.

12. The computer-implemented method of claim 8, further comprising arranging the plurality of items comprising the search results in accordance with an image layout in the network page.

13. The computer-implemented method of claim 7, wherein the fingerprint for the query is determined based at least in part on identifying one or more actions performed by a plurality of users of the electronic marketplace in relation to the query.

14. The computer-implemented method of claim 13, wherein the one or more actions comprise at least one of a re-formulation of the query, a term swap, a term addition, a term deletion, an abandonment of the query, an item detail page click, a refinement of the query or a scope change of the query.

15. A computerized system comprising:
memory that stores computer-executable instructions; and
at least one processor configured to access the memory, the at least one processor configured to execute the computer-executable instructions to collectively at least:
identify an indication of a query executed by a user of an electronic marketplace;
identify an action performed by the user in relation to the query;
access a query classification database having information associated with a plurality of fingerprints, a fingerprint of the plurality of fingerprints comprising a vector of features;
determine a fingerprint of the plurality of fingerprints to be associated with the query by comparing a vector representing the action to the fingerprints of the plurality of fingerprints;

identify a plurality of categories related to the query based on the fingerprint;

generate an interactive network region in a network page comprising search results related to the query, the interactive network region identifying the plurality of categories;

provide information to render the network page comprising the interactive network region and the plurality of categories identified in the interactive network region;

receive a selection of a category from the user;

generate an updated interactive network region based at least in part on the selected category; and provide information to render the updated interactive network region to the user.

16. The system of claim 15, wherein the at least one processor is configured to execute the computer-executable instructions to obtain search results related to the query based at least in part on the plurality of categories and arrange a plurality of items comprising the search results in accordance with a grid layout in the network page rendered to the user.

17. The system of claim 16, wherein the at least one processor is configured to execute the computer-executable instructions to arrange the plurality of items comprising the search results in accordance with a list layout to the user.

18. The system of claim 16, wherein the at least one processor is configured to execute the computer-executable instructions to arrange the plurality of categories in the interactive network region in an image layout to the user.

19. The system of claim 15, wherein the at least one processor is configured to execute the computer-executable instructions to identify a search term in the query issued by the user, wherein generating the interactive network region is based at least in part on the identified search term.

20. The system of claim 15, wherein the at least one processor is configured to execute the computer-executable instructions to enable the user to view additional details related to the selected category in the updated interactive network region.

21. One or more non-transitory computer-readable media collectively storing computer-executable instructions that, when executed by one or more computer systems, configure the one or more computer systems to collectively perform operations comprising:
receiving an indication of a query executed by a user of an electronic marketplace;
identifying an action performed by the user in relation to the query;
accessing a query classification database having fingerprint information that comprises a plurality of fingerprints, each fingerprint comprising a vector of features;
determining a fingerprint of the plurality of fingerprints to be associated with the query based at least in part on the action by comparing a vector representing the action to the fingerprints of the plurality of fingerprints; and
generating an interactive network region comprising search results related to the query in a network page based at least in part on the fingerprint.

22. The non-transitory computer-readable media of claim 21, further comprising arranging a plurality of items comprising the search results in the interactive network region in accordance with a grid layout based at least in part on the fingerprint.

23. The non-transitory computer-readable media of claim 21, further comprising identifying a plurality of categories related to the query based on the fingerprint.

24. The non-transitory computer-readable media of claim 23, further comprising arranging the plurality of items comprising the search results related to the query in accordance with a layout within each category of the plurality of categories in the interactive network region.

* * * * *